US007511697B2

(12) United States Patent
Peterson

(10) Patent No.: US 7,511,697 B2
(45) Date of Patent: Mar. 31, 2009

(54) FACILITY REFERENCE SYSTEM AND METHOD

(75) Inventor: Judd Peterson, Eden Prairie, MN (US)

(73) Assignee: OMEGAVUE, Inc., Edina, MN (US)

( * ) Notice: Subject to any disclaimer, the term of this patent is extended or adjusted under 35 U.S.C. 154(b) by 629 days.

(21) Appl. No.: 11/084,577

(22) Filed: Mar. 18, 2005

(65) Prior Publication Data

US 2005/0246628 A1    Nov. 3, 2005

Related U.S. Application Data

(60) Provisional application No. 60/555,022, filed on Mar. 19, 2004.

(51) Int. Cl.
*G09G 5/00* (2006.01)
(52) U.S. Cl. .................. 345/156; 345/440
(58) Field of Classification Search ......... 345/156–160, 345/418–428, 440–475
See application file for complete search history.

(56) References Cited

U.S. PATENT DOCUMENTS

| | | | |
|---|---|---|---|
| 5,185,857 A | 2/1993 | Rozmanith et al. | |
| 5,745,751 A | 4/1998 | Nelson et al. | |
| 6,157,943 A | 12/2000 | Meyer | |
| 6,202,060 B1* | 3/2001 | Tran | 707/3 |
| 6,745,200 B2 | 6/2004 | Starkey | |
| 2002/0035495 A1 | 3/2002 | Spira et al. | |
| 2002/0073114 A1 | 6/2002 | Nicastro et al. | |
| 2002/0077939 A1 | 6/2002 | Nicastro et al. | |
| 2002/0083076 A1 | 6/2002 | Wucherer et al. | |
| 2002/0129001 A1 | 9/2002 | Levkoff et al. | |
| 2002/0145620 A1 | 10/2002 | Smith et al. | |
| 2002/0188610 A1 | 12/2002 | Spencer, Jr. | |
| 2003/0083953 A1 | 5/2003 | Starkey | |
| 2003/0172002 A1 | 9/2003 | Spira et al. | |
| 2003/0200062 A1 | 10/2003 | Dessureault et al. | |
| 2004/0015367 A1 | 1/2004 | Nicastro et al. | |
| 2004/0044672 A1 | 3/2004 | Spencer, Jr. | |
| 2004/0128313 A1* | 7/2004 | Whyman | 707/103 R |
| 2004/0225968 A1* | 11/2004 | Look et al. | 715/778 |

OTHER PUBLICATIONS

Web site print-out: Aperture Solutions; 3 pages; Copyright 2004.

(Continued)

*Primary Examiner*—Vijay Shankar
(74) *Attorney, Agent, or Firm*—Patterson, Thuente, Skaar & Christensen, P.A.

(57) ABSTRACT

A facility reference system and method are disclosed by which data and information can be organized, accessed, viewed, and monitored. The information can be installed and accessed from a local computer, system, or network and can include data and documents of a variety of formats. The information is presented so as to provide access for persons both from technical and non-technical backgrounds. One principal of the invention is to provide consistent, centralized access to facilities management information. Further, a mechanism can be implemented to allow the user to easily email information residing in the system to an email recipient. Further still, printing capabilities can be implemented that will allow consistent, standard output of the data. Editing capabilities are provided to allow editing of spreadsheet data. A search mechanism is also provided to efficiently locate and view required data.

30 Claims, 32 Drawing Sheets
(29 of 32 Drawing Sheet(s) Filed in Color)

OTHER PUBLICATIONS

Web site print-out: *"Facility Management System Facilitator® 4i,"* RL Labs JSC, 3 pages, Copyright 2001-2004.

Web site print-out: *"Facilities, Project & Infrastructure Management,"* MASS Information Systems Ltd., 5 pages.

Web site print-out: *"Space Utilization Management with Facility Focus™,"* Maximus, Inc., 3 pages, Copyright 2003.

Web site print-out: *"FacMan,"* Western Washington University Facilities Management, 2 pages, Copyright 2000.

*"Company Profile,"* CAFM Services, 16 pages, Copyright 2002, 2003.

*"ARCHIBUS/FM Web Central® 14 Among Top 100 Products Picks,"* ARCHIBUS, Inc., 1 page, Dec. 14, 2004.

*"FM Web Central 14®, Enhanced Communication and Collaboration,"* ARCHIBUS, Inc., 9 pages, Jun. 2004.

*Tririga®*, Brochure, Trirga LLC, 12 pages, Copyright 2003.

*"CAFM Services, Knowledge+ Process+ Technology,"* CAFM Services, 4 pages, Aug. 24, 2002.

Web site print-out: *"Facilities, Project & Infrastructure Management,"* MASS Information Systems Ltd., 5 pages. 2003.

*"ARCHIBUS/FM web Central® 14 Among Top 100 Products Picks,"* ARCHIBUS, Inc. Dec. 7, 2003.

* cited by examiner

FACILITY REFERENCE SYSTEM AND METHOD

RELATED APPLICATION

This application claims the benefit of U.S. Provisional Application No. 60/555,022 filed Mar. 19, 2004, which is incorporated herein by reference in its entirety.

COMPACT DISC

A compact disc containing codes and information describing a preferred embodiment of the present invention is submitted herewith and is hereby incorporated by reference. The compact disc contains the following programs:

| TITLE | SIZE IN BYTES | DATE OF CREATION |
|---|---|---|
| code.txt | 334 KB | Mar. 18, 2005 |

FIELD OF THE INVENTION

The invention relates generally to computer systems, and to data management and processing. More particularly, the invention relates to a computerized system for organization and management of architectural and engineering plans, data, and information relating to a facility.

BACKGROUND OF THE INVENTION

In the past and even still today, owners of real estate property typically have hard copy paper plans and specifications of the as-built conditions of their buildings or campuses. In more recent times, these record sets are often furnished in CAD and digital word processing formats.

Owners have generally continued to file these records as hard copy documents, not fully utilizing the available information and potential accessibility. Because of this, facilities directors do not often have the information they need about their buildings in a convenient and useful interface that is accessible from multiple points within a distributed geographical area by relevant personnel.

For example, a college campus facilities manager is responsible for monitoring and maintaining a large and diverse building set. In addition to basic building plans and specifications, including architectural layouts and electrical, plumbing, and heating/ventilation/air conditioning (HVAC) system information, a campus facility manager is generally responsible for maintenance data and records, audio/visual capabilities, and scheduling information, often at an individual room level. If a maintenance request is filed to replace a lighting element in a particular room in a particular building, a facility manager needs to have the necessary information available quickly, in this situation the specific lighting element type and size and the time availability of the room during which maintenance personnel may enter in order to make the requested replacement or repair without disrupting a class, meeting, or other activity. Significant work hours are lost if personnel must first be sent to the room to determine what service or item is needed, go to a storage area in order or retrieve the necessary equipment or part, and return again to the room with the part, only to find that a class is now in session and the change-out cannot be accomplished.

In an attempt to make facility information more available and accessible, computer-based systems have been developed. These systems typically store and organize information pertaining to a particular building or building campus, or provide access and control of security, scheduling, or climate systems.

For example, U.S. Pat. No. 6,157,943 to Meyer discloses Internet access to a facility management system. The facility management system described in the Meyer patent generally controls environmental systems such as HVAC and lighting within a building. A primary workstation connected to a network executes a supervisory control program that gathers status data regarding the operation of components of the facilities management system and stores information regarding the configuration of the facilities management system and operational data associated with each level of the system organization. Remote users may access the facilities management system using a standard, commercially available Web browser on a personal computer. The system may be implemented for a single building or a campus system.

U.S. Patent Publication No. 2002/0083076 to Wucherer et al. discloses a system and method for linking computer aided design (CAD) elements with non-graphical information within a database. The system may comprise level files and area files, wherein each of the area files may contain a CAD system generated area perimeter having one or more CAD system generated sub-areas and/or one or more CAD system generated CAD elements. In the embodiment described in the specification of the Wucherer patent, which relates to a hotel/casino construction project, the CAD elements may represent HVAC systems, electrical distribution systems, plumbing systems, structural systems, doors, windows, molding, chairs, fabrics, sub-elements of any of the above, or the like.

Starkey discloses a facility management system in U.S. Patent Publication No. 2003/0083953. The facility management system implements a multi-dimensional relational database to support the service delivery functions within a facility as well as the management of the physical plant that comprises the facility. One module of the system provides for the identification of all of the components of the facility, including structure location, architecture, components, contents and personal possessions. The preferred embodiment described in the publication is that of estate household management.

Other systems manage the design and construction of new buildings. For example, U.S. Patent Publication No. 2002/0073114 to Nicastro et al. discloses a business asset management system that allows comprehensive management of an asset from design through building and management. The system captures and manages information throughout the design, build, and manage phases of the resulting asset.

U.S. Patent Publication No. 2002/0077939, also to Nicastro et al., discloses a system for defining and managing an asset. The system includes a data store for item specification data provided on a host computer coupled to a network, and a data input toolset comprising at least an item type manager and an item specification manager.

Other similar systems currently available include Aperture Solution's data center infrastructure management and workplace management systems, ARCHIBUS, Inc.'s FM products, CAFM service's computer aided facilities management systems, and MASS Information System Ltd.'s computer integrated facilities management solutions. MAXIMUS, Inc., offers a facility focus and space management product, and RL Labs discloses the FACILITOR 4*i* application web interface. Western Washington University describes a facilities management application called FacMan for maintenance backlog and capital renewal.

While facilities management systems such as those described above generally provide computer-based access to and management of facility information, none offers a fully integrated distributed reference system. Further, currently available systems are typically complex from a programming and use perspective, limiting their compatibility with a wide variety of commercially available operating systems and requiring a high level of computer programming skill to use and manage.

SUMMARY OF THE INVENTION

A principle of the facility reference system of the invention is to provide access to architectural, engineering, and other facilities management information from one or a plurality of locations. The access level can be general or privileged, with editing, reporting, monitoring, and other advanced features provided to privileged users in one preferred embodiment. The system can be configured to operate in a client/server environment to allow for Internet access to the information from distributed locations, which is typically desired on campuses and multi-building sites.

Another principle of the invention is to present data in a standardized, uniform manner utilizing a typical web browser program for ease of management and reference referral. Preferred embodiments of the facilities reference system will not require a user to load specialized or customized software to access or view the information, outside of the standard web browser plug-in functionality loaded by the system. Additionally, the information presented will not be compromised and will accurately reflect the original informational content as presented by the creator.

These and other principles of the invention may be accomplished by a computer-implemented facility reference system, a method of managing facility reference data and information in a computer system, and a computer-readable storage media storing at least one computer program operating as a facility management system for managing data and information related to a facility.

According to one aspect of the invention, a computer-implemented facility reference system comprises custom content related to a facility, wherein the custom content comprises graphical content, textual content, or any combination thereof and is related to at least one of an architectural, mechanical, and physical feature of a facility, and wherein the custom content has a format type and a variable associated therewith; and a user interface, wherein the user interface selectively displays custom content and information related to the custom content on a computer system according to the variable associated with the custom content, and wherein the user interface includes tools selectable to manage the custom content, edit the custom content, and create new custom content, and an expandable document tree navigation structure to present the custom content with the user interface and on the computer system, wherein the tools are available and selectable according to the variable associated with the custom content.

According to a further aspect of the invention, a method of managing facility reference data and information in a computer system can comprise the steps of assembling custom content related to a facility, wherein the custom content comprises graphical content, textual content, or any combination thereof and is related to an architectural, mechanical, or physical feature of a facility; associating a variable with the custom content according to a format of the custom content; providing the assembled custom content and a user interface to the custom content; providing a hyperlinked index of the assembled custom content in a navigable and expandable document tree navigation structure in the user interface; selectively displaying the custom content in the user interface according to the variable associated with the custom content; and providing, in the user interface, tools to selectively view, manage, and edit the custom content in the user interface and to create new custom content, wherein the tools available in the user interface vary according to the variable associated with the custom content.

According to a further aspect of the invention, implemented in a computer system, a computer-readable storage media storing at least one computer program operates as a facility management system for managing data and information related to a facility, the program comprising the steps of obtaining custom content related to a facility, wherein the custom content comprises graphical content, textual content, or any combination thereof and is related to at least one of an architectural, mechanical, and physical feature of a facility; determining a document format of the custom content and associating a variable with the custom content based upon the determined format; providing a user interface to the custom content at the computer system; providing a hyperlinked index of the custom content in a navigable and expandable document tree navigation structure in the user interface; receiving instructions in the user interface to retrieve selected custom content; retrieving the selected custom content and determining the variable associated with the selected custom content; generating an image in the user interface related to the selected custom content according to the variable associated with the custom content; and automatically updating the document tree navigation structure according to the image in the user interface.

The above summary of the invention is not intended to describe each illustrated embodiment or every implementation of the invention. The figures and the detailed description that follow more particularly exemplify these embodiments.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

The invention may be more completely understood in consideration of the following detailed description of various embodiments of the invention in connection with the accompanying drawings, in which.

Figure 1:
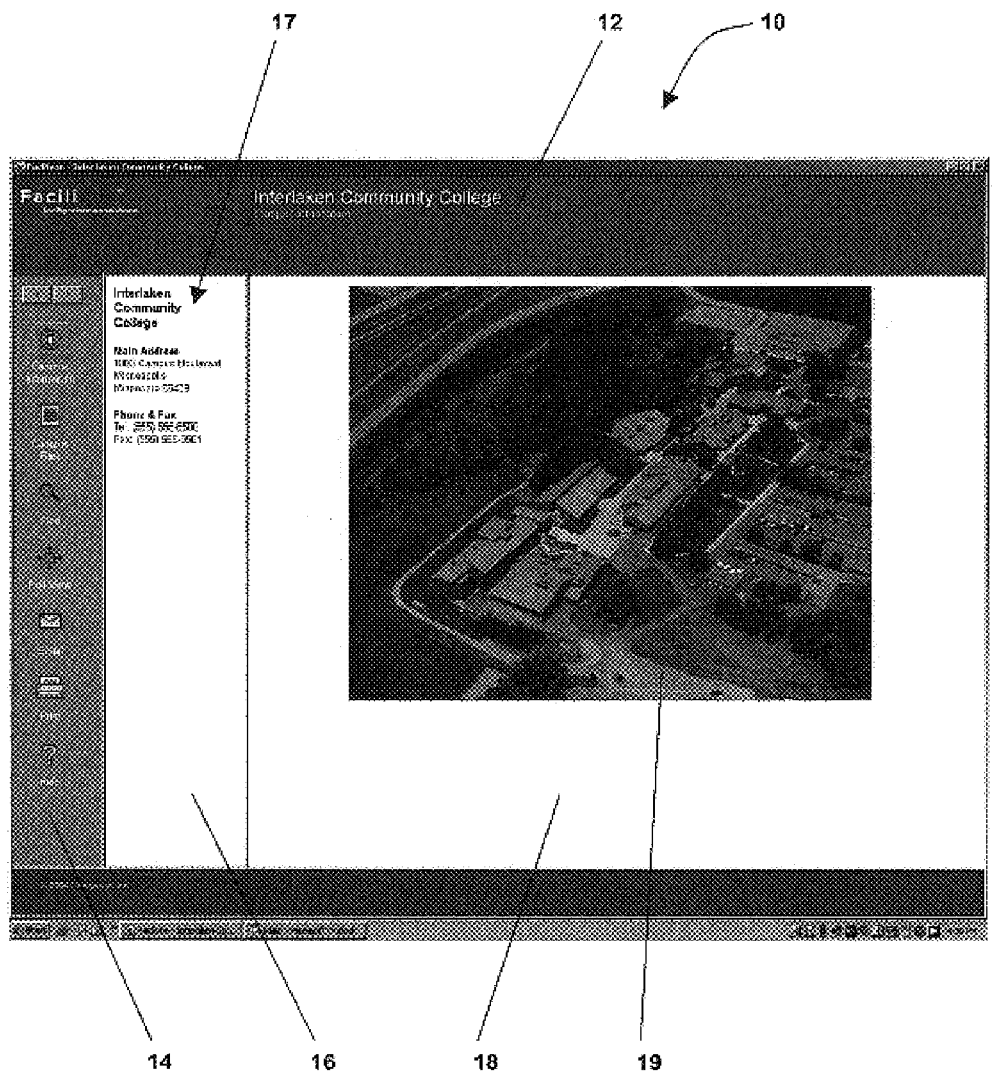
FIGS. 1-4 are views of a user interface according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The facility reference system of the invention simplifies access to, and management and organization of, facility data and information. The system provides an intuitive user interface and can be accessed from locally distributed and plural geographical communicatively networked locations. The invention can be more readily understood by reference to FIGS. 1-32, the accompanying compact disc and its contents, and the following description. While the invention is not necessarily limited to such an application, the invention will be better appreciated using a discussion of exemplary embodiments in specific contexts.

The facility reference system of the invention generally comprises a facility reference system and a user computer system. The facility reference system comprises computer-executable instructions installed and operating on the user computer system from a computer-readable medium. The user computer system can comprise a single computer, a networked computer or computers, or a local client/server configuration. The facility reference system further comprises facility data and information input into or otherwise accessible by the computer system.

A user function of the system utilizes the custom input of each user's data information. A system user will typically be a property owner, manager, or employee. In one embodiment, the system is initially created, loaded, and configured by a system administrator and/or supplier, who then provides the customized system to a user for installation on the user's computer system. In another embodiment, data and information are partially or wholly user-input and customized.

The system of the invention relies in part upon the input of facility information according to various system criteria. In one preferred embodiment, the system is custom-built and loaded for a facility owner or manager with plans, data, and other information relating to a particular facility by a system supplier.

Herein throughout the description, the terms "facility owner," "owner," "facility manager," "manager," and like terms will be used to generally refer to a person responsible in some way for a facility, campus, building, or property, or its management, service, or maintenance, who may also be a system user. The terms "system supplier," "supplier," "programmer," "administrator," and like terms will be used to generally refer to a person involved in the creation, customization, set-up, programming, and/or provision of the system, although a system supplier, supplier, or programmer may also be a system user and, as described in more detail below, a facility owner, owner, facility manger, or manager can be given system programming and customization permissions. A "system user" or "user" is any person, including any of the aforementioned groups of people, who accesses, views, or otherwise utilizes the system. In all cases, reference should be made to the particular context surrounding the use of the term in order to ascertain the intended meaning. Terms used in the appended claims are to be given their ordinary meaning. Particular program formats, names, languages, and the like used herein throughout are only exemplary of preferred embodiments of the invention and are not to be construed as limiting, as other program formats, names, languages, and the like can be used, as can be appreciated by those skilled in the art, without departing from the spirit or scope of the invention.

According to a preferred embodiment, facilities management information can be accessed and viewed utilizing a standard web browser program. The information can be installed and accessed from a local computer. The information is presented via a user interface so as to provide access to persons having technical or non-technical backgrounds. One particular advantage of the invention is that the user interface is intuitively based upon and utilizes standard computer and Internet website functions. Users can understand system functions and find and use information without specialized computer or programming training if they have everyday experience with simple computer and Internet functions. In addition, the system does not directly require the use of dynamic link libraries or executables to operate on a user computer or computer system. Preferred embodiments of the system run on standard operating system software typically provided with most personal computers. The system uses standard web browser functions for presentation and viewing of the data in a user interface. This aspect minimizes the risk of malfunction or incompatibility with a user's existing computer programs or configuration. The user interface and system further allow users to view standard CAD drawing files without having to separately install the original CAD software used to develop the drawing. One principle of the invention, therefore, is to provide consistent, centralized access to facilities management information.

After the system has been created, loaded, and configured and subsequently installed on a user computer system, the system is generally available for user-customized layout and design. An owner can access floor plans, room specifications and details, or any other information about a campus, building, or any individual part of the building, including incorporated photographs of parts of the building or of equipment within or features of the building, using preferred embodiments of the system of the invention. Facility managers can view, modify, and print all or part of a building plan, or may view, modify, and print a schedule of information provided for a room of the building. Additionally, the system can provide graphic symbols or formatted text that activate hyperlinks to other documents and information. A typical hyperlink allows a user to open a new data window that provides more detailed information about the previous data window or its content, related data or information, or other relevant content. In preferred embodiments, the system can provide hyperlinks to a variety of window content, including additional CAD plans or plan details, photos, web-based resources, related programs and/or content, real-time monitoring devices, and the like. The invention can also hyperlink to other software applications of the user to return directly to use of the invention.

System content, for example CAD plans and schedule data, are formatted in one preferred embodiment to reside within the system, providing quick and easy access to and recovery of data. Drawings or plans can be existing documents or files, for example those created during the design and construction of a building, or newly drawn for incorporation into the system. The system is thereby applicable and relevant to nearly any building, structure, or campus for which electronic facility reference information is desired. CAD plans developed from original hard copy plans or from observations of actual, as-built real estate can be formatted within the system according to customary layering criteria of the architectural CAD industry standards developed by the AIA, the American Institute of Architects. Alternatively, custom format schemes can be developed within embodiments of the system according to a manager's or a user's particular needs. Layering of drawings can be manipulated by a user to either show or hide certain drawing layers of information.

Schedules can be developed to address standard physical characteristics and features of campuses, buildings and rooms of interest to managers and users, including types of flooring, ceiling, walls, doors, and lighting; styles of materials and hardware; colors; brands, makes, and models; HVAC and electrical services; audio/visual and other technological features; and the like. Although a majority of the information in the system preferably is pre-loaded and customized by a programmer in preferred embodiments, owners and certain users can be given higher-level editing access to the information, for example by security code or logon access to a designated editing workstation. In environments in which multiple users access the system, the system can be password protected. In one embodiment, the system incorporates a hierarchical password system, permitting general user access or password protected administrative and editorial access. Accordingly, owners can elect to load their own supplementary data in addition to the base information within the invention, and keep system data and information current with ongoing or periodic updates. In one embodiment, schedules can also include manager- or user-inserted digital photographs and other graphic images and representations to further elaborate the document records of the real estate.

Further, a mechanism has been implemented to allow the user to easily email information residing in the system to an email recipient. The user interface allows the user to capture all or a portion of a plan and email the selection. The user interface also provides zoom and print functions that enable a user to view all or zoom view to a portion of the building and print any desired view. Further still, printing capabilities have been implemented that will allow consistent, standard output of data. Editing capabilities have been provided to allow editing of spreadsheet and plan data. A search mechanism has been provided to efficiently locate and view required data. Owner's vendor information, including phone listings and contact data, that may not be otherwise included within the invention, is provided by way of a directory listing based upon a paid subscription from each vendor.

The system can therefore be used in a variety of settings and situations and by a variety of users. In one embodiment, the system is implemented in a relatively small-scale facility, for example a single building or cluster of buildings. More large-scale implementations envisioned include corporate and educational campuses, recreational facilities, and municipalities. In any of these implementations, one preferred embodiment of the system provides communication capabilities such that the facility reference system can generally communicate with or be partially or fully integrated into other facility systems, for example HVAC and climate control, mechanical, security, monitoring, technical, and/or others, such that users can access real-time status information in a user interface. Such communications can be enabled via a common computer system or network connection between the facilities management system and other facility systems. Editing or status change permissions may or may not be provided, depending upon system capabilities, level of integration, user access level, and other criteria. For example, one embodiment of a facility management system can be implemented in a health care facility. In general, the architectural and mechanical features of the facility can be managed in the system. Other features can be implemented to monitor equipment and locate personnel and patients, for example real time in-use information of a laboratory device, a temperature or content monitor of storage or temperature-controlled equipment, and other applications as needed or desired.

FIG. 1 illustrates one embodiment of a user interface 10 of the system of the invention. User interface 10 generally includes a project information area 12, a project tool area 14, a project data area 16, and a project window 18. In the embodiment shown, interface 10 upon initial program execution includes a facility overview photograph 19 loaded in window 18 and general facility information 17 in data area 16. The initial photograph or screen loaded in project window 18 and information included in areas 12 and 16 can be customized, for example to default to a particular campus, building, or other desired view with respect to window 18.

Prior to displaying interface 10, the system was loaded and installed on the user computer or computer system as previously described. Software system installation is generally understood and known to those skilled in the art. At the initial program execution point illustrated in FIG. 1, the system sets a document variable using JAVASCRIPT, for example, or another language known to those skilled in the art, and makes available in project tool area 14 the various functions that can be performed on the selected drawing or document. These functions are described in further detail below.

Figure 2:
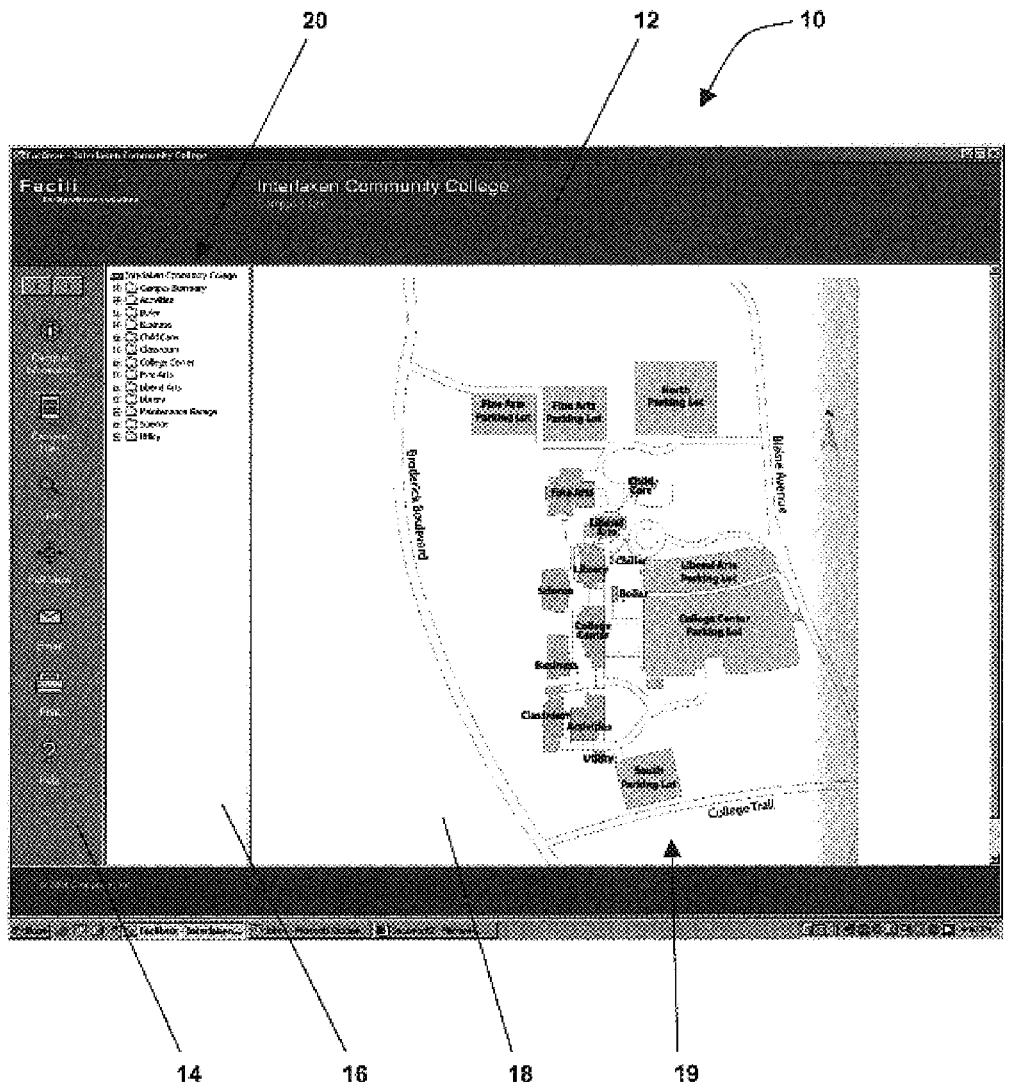

In one embodiment, the drawings or documents are made available to the user using a document tree 20 in project data area 16 as shown in FIG. 2. Document tree 20 provides a mechanism by which to easily and intuitively navigate among the available drawings or documents available for viewing, editing, and other functions in user interface 10. Window 18 further enhances system navigability in cooperation with document tree 20. In FIG. 2, window 18 includes a campus footprint diagram 19. For more information regarding a particular building or area, a user can navigate by expanding document tree 20 or by selecting an area of interest in diagram 19.

Figure 3:
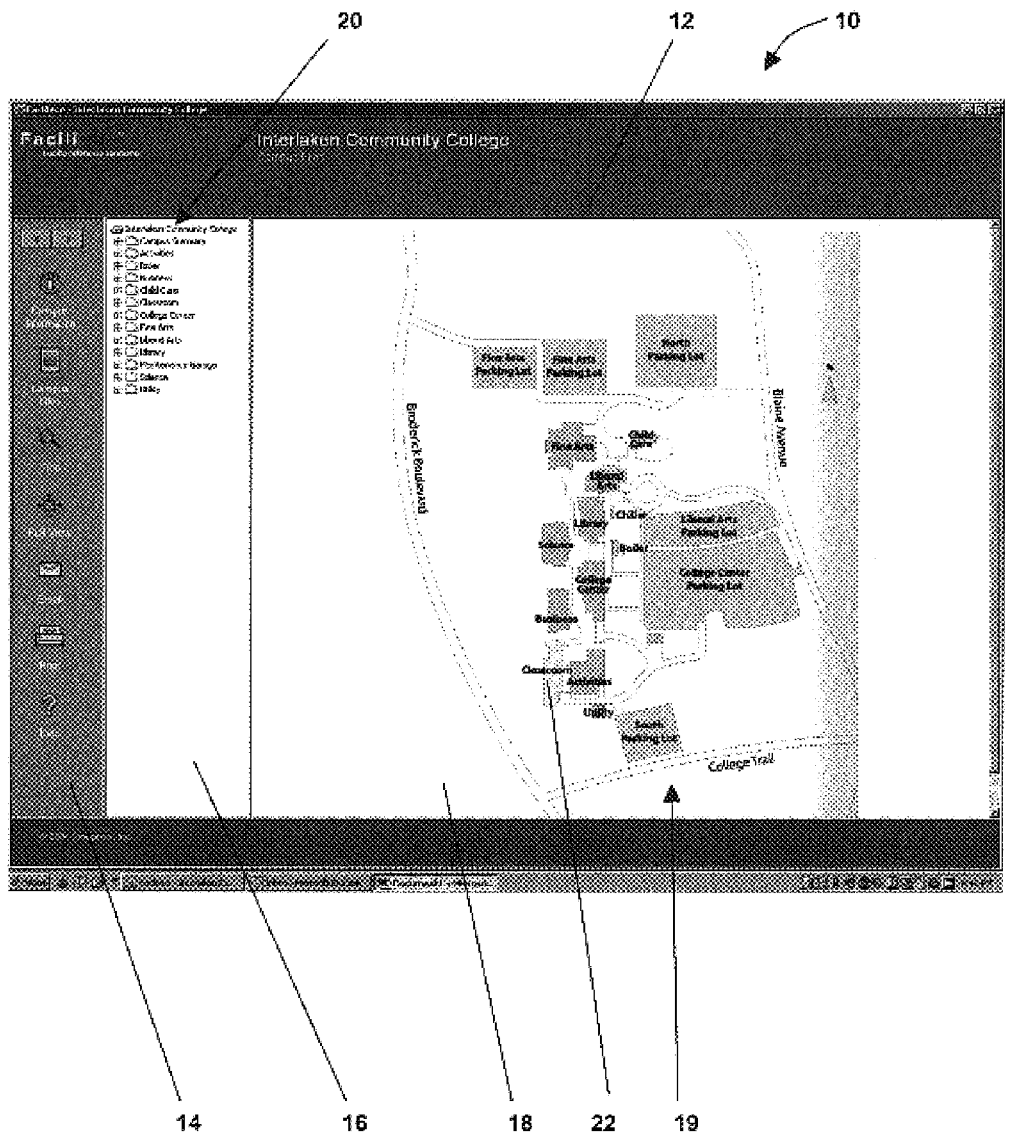
Figure 4:
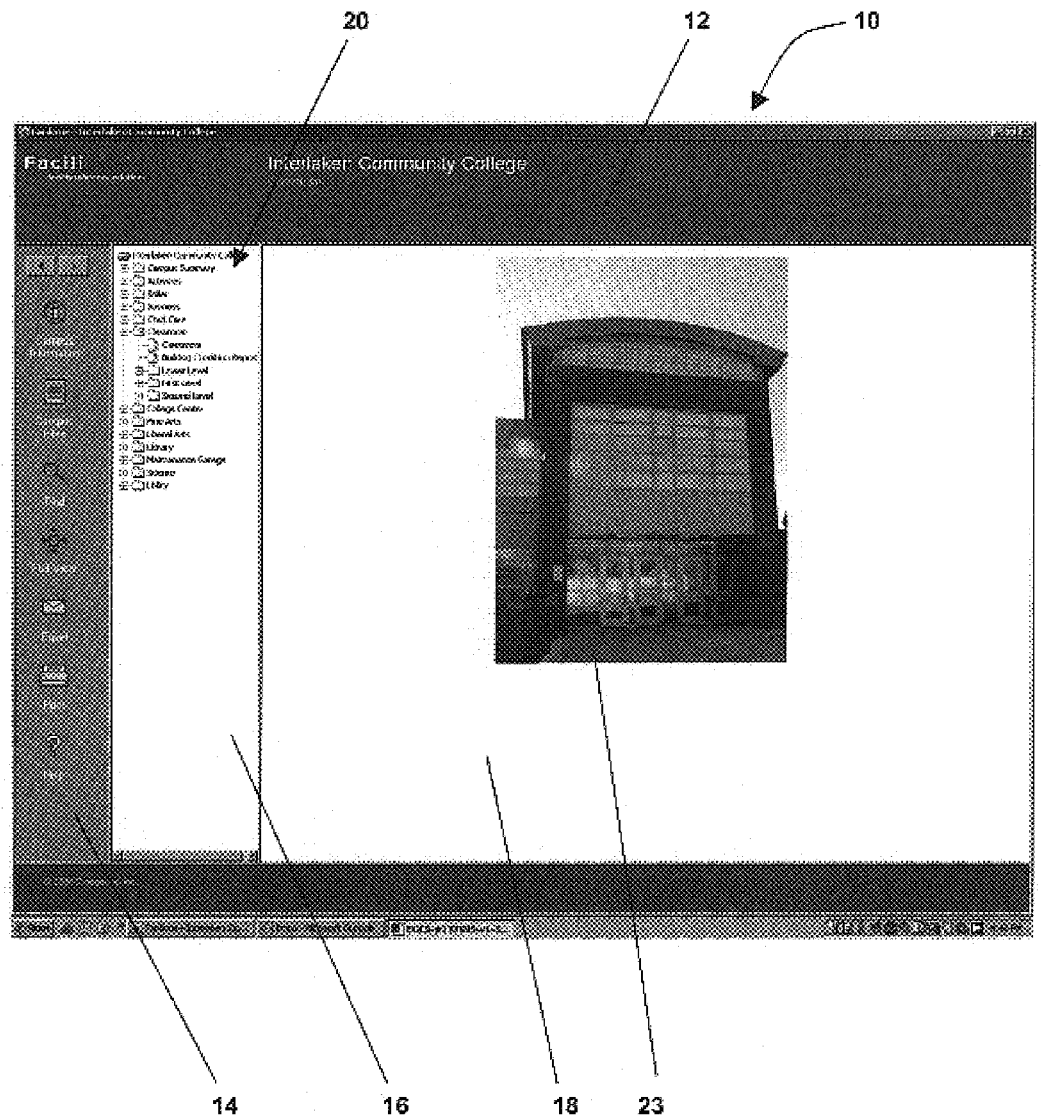
Figure 5:
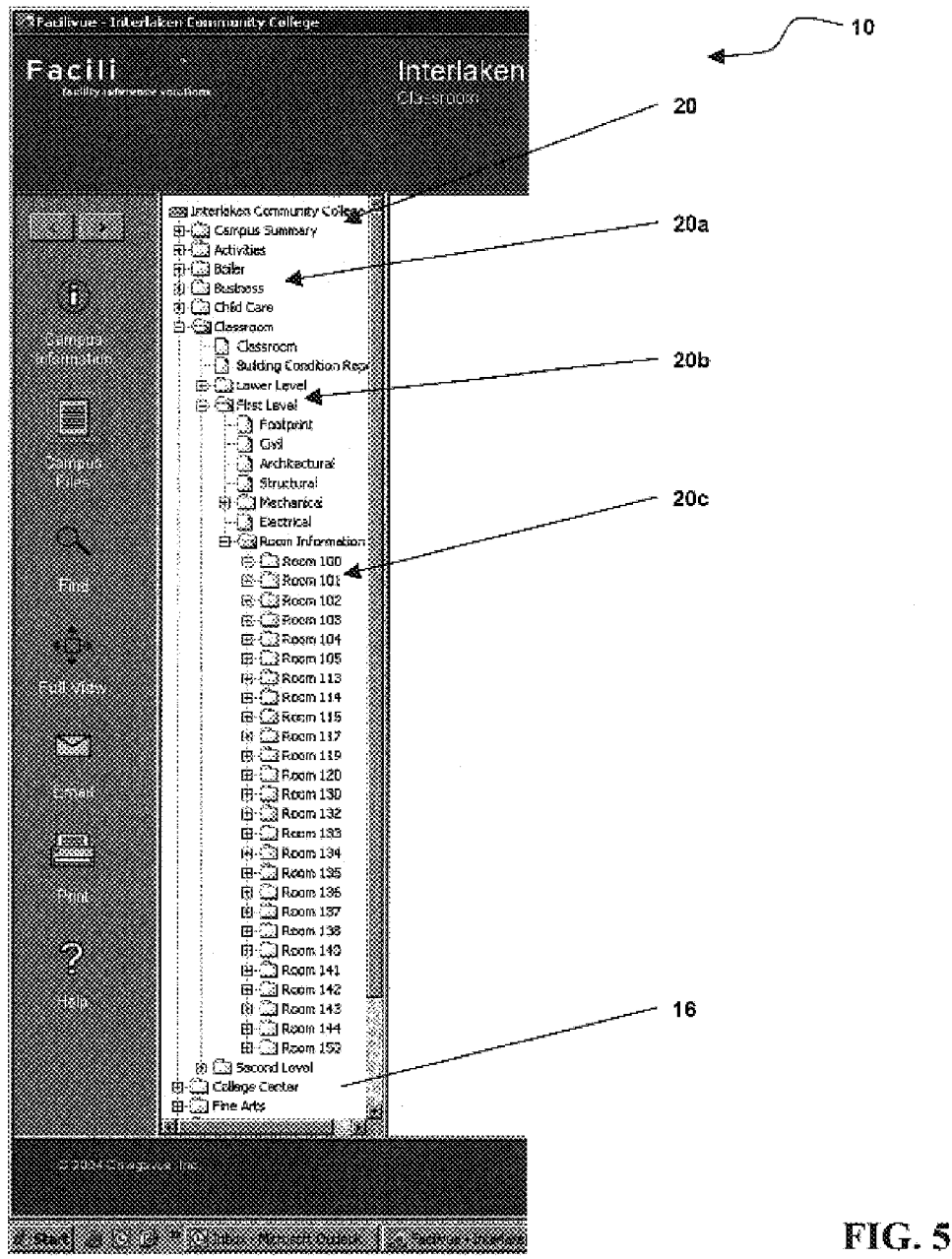
FIG. 5 is an enlarged view of a portion of a user interface according to one embodiment of the invention.

For example, FIG. 3 shows a cursor-highlighted classroom building 22, and FIG. 4 shows user interface 10 after building 22 has been selected. After selection of a particular area of interest in one embodiment, interface 10 provides additional information. The information provided can be customized as needed or desired. In FIG. 4, window 18 has advanced to a photo 23 of building 22 and document tree 20 has automatically expanded to display available files, folders, and documents related to building 22.

Document tree 20 is hierarchical and is generally familiar to users of computer operating systems, programs, and other computer products and provides an easy and intuitive interface through which system users can quickly find desired information. Other directories can be configured by a system administrator or user as desired or required. In the example depicted in the Figures herein, and referring to the enlarged document tree 20 shown in FIG. 5, the campus shown is first divided at building level 20a (College Center, Classroom Building, Fine Arts, for example), then a floor level 20b, and finally a room level 20c. This hierarchy can be customized for a particular facility or building or as desired by a user, the campus depicted being exemplary of only one embodiment.

Figure 6:
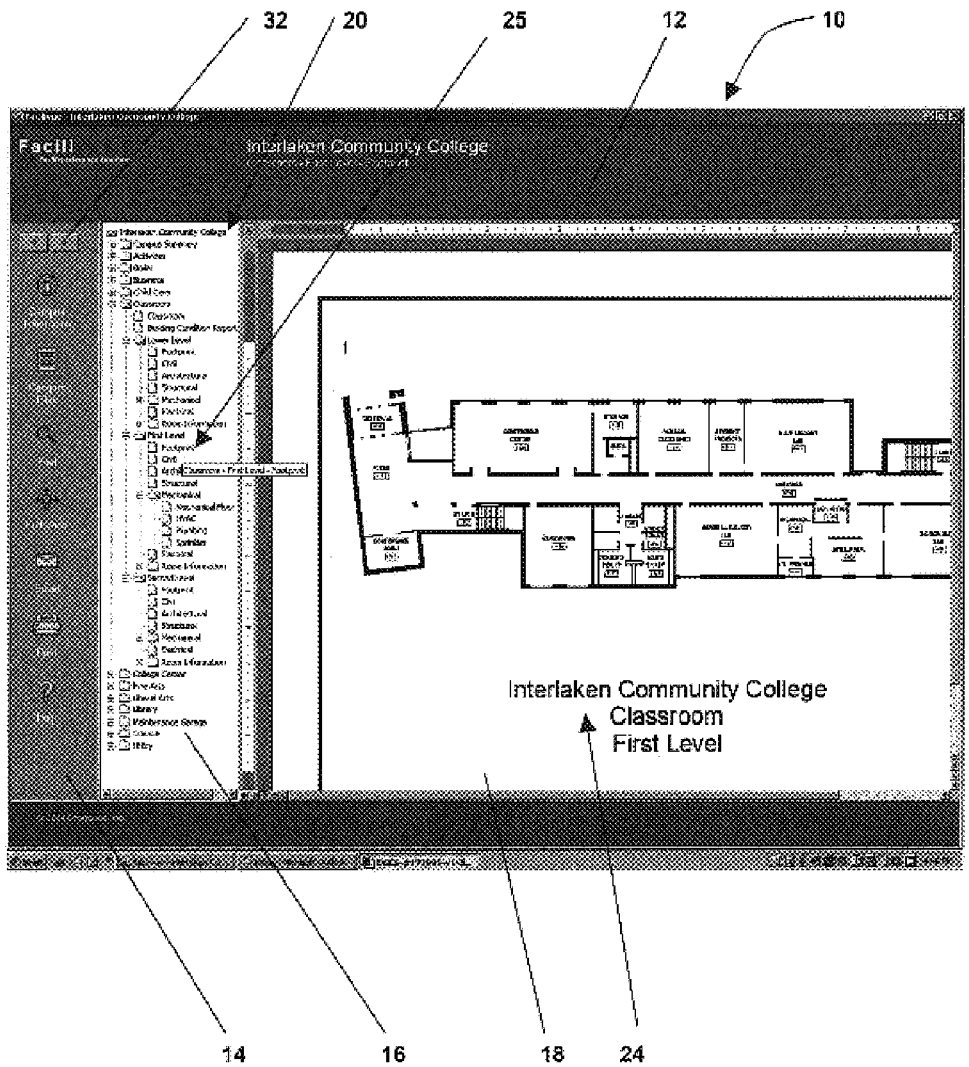
FIGS. 6-22 are views of a user interface according to one embodiment of the invention.
Figure 7:
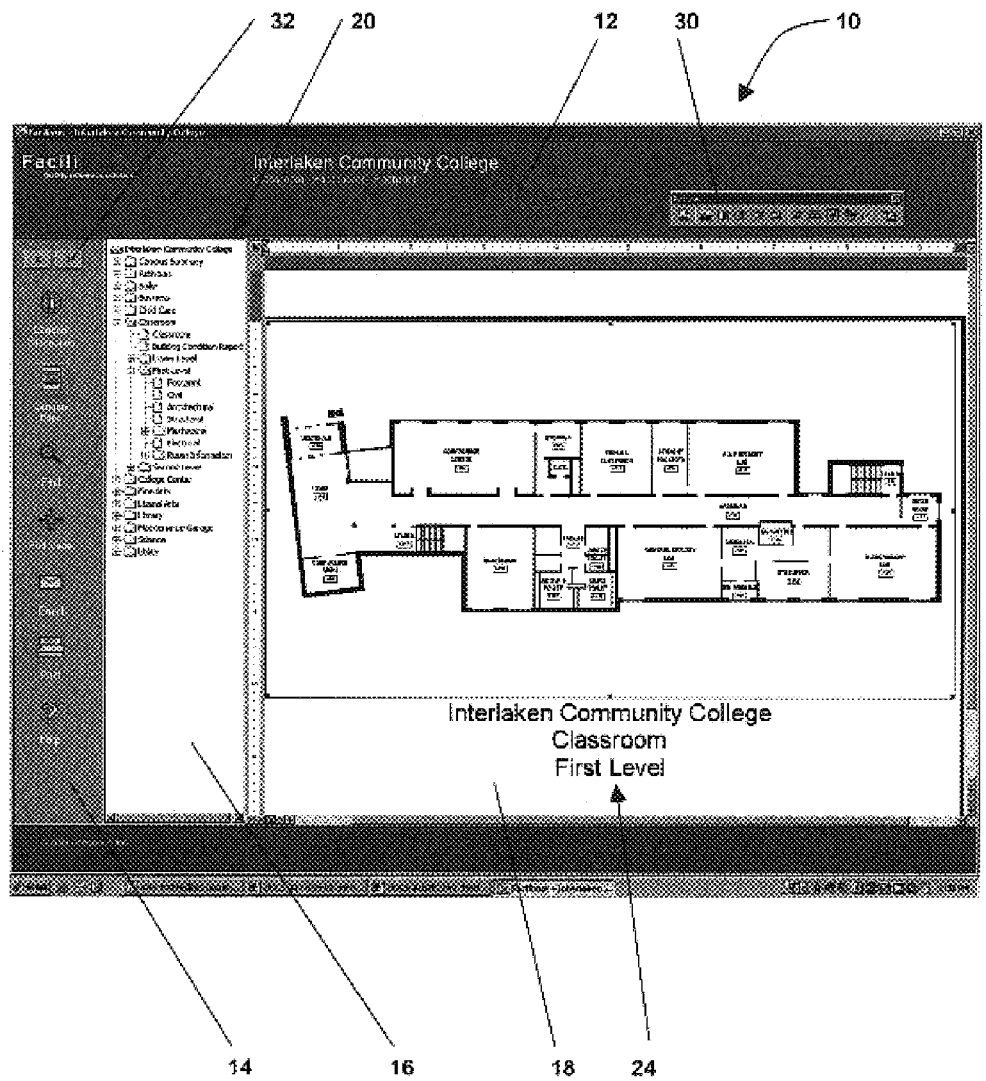
Figure 8:
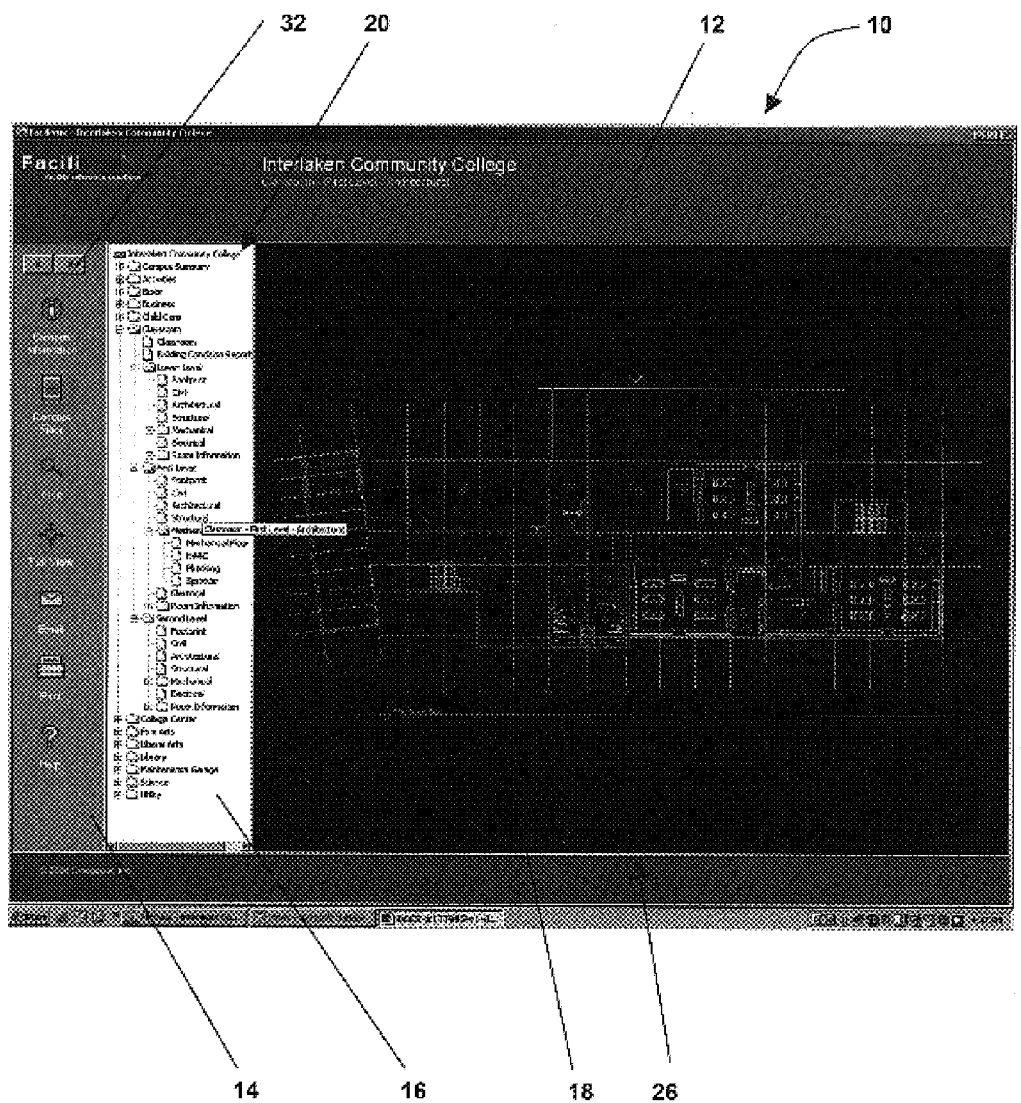

A user can navigate among the levels of images and views in window 18 using document tree 20. Selecting the desired level 20a-c or building name shown in area 16 will display the corresponding picture or CAD view in window 18. In another embodiment, a user can select a particular building or area in project window 18 in order to view a more detailed or related image. In FIGS. 6 and 7, a basic plan, or "footprint," view 24 of a first level of building 22 is displayed in window 18 after selection (25) from within document tree 20, while FIGS. 8-10 include an architectural CAD plan 26 and FIGS. 11-13 a mechanical plan 28 of the same level of building 22. As each view changes, the information included in information area 12 can automatically update accordingly. Further, to make navigation more intuitive and convenient, tool area 14 includes forward and backward navigation buttons 32, enabling a user to quickly navigate to and display a previous view.

Figure 11:
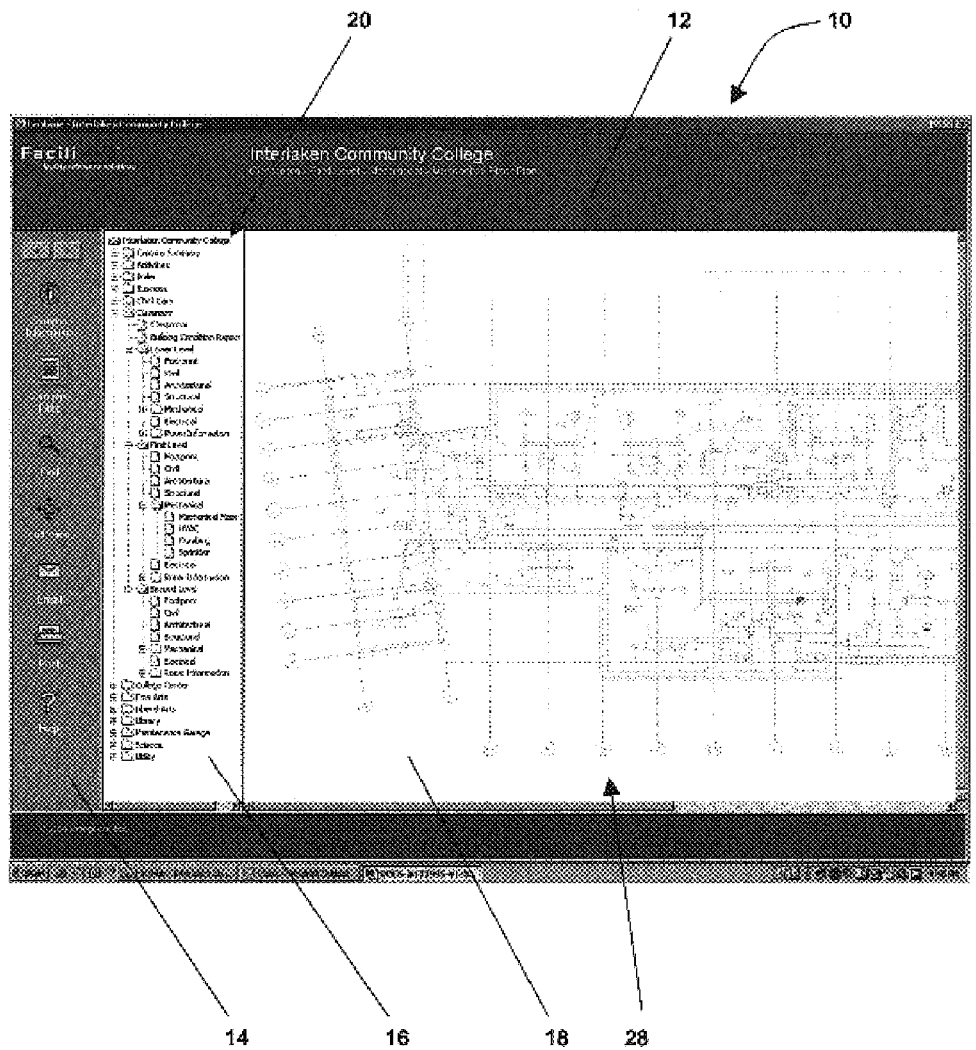
Figure 12:
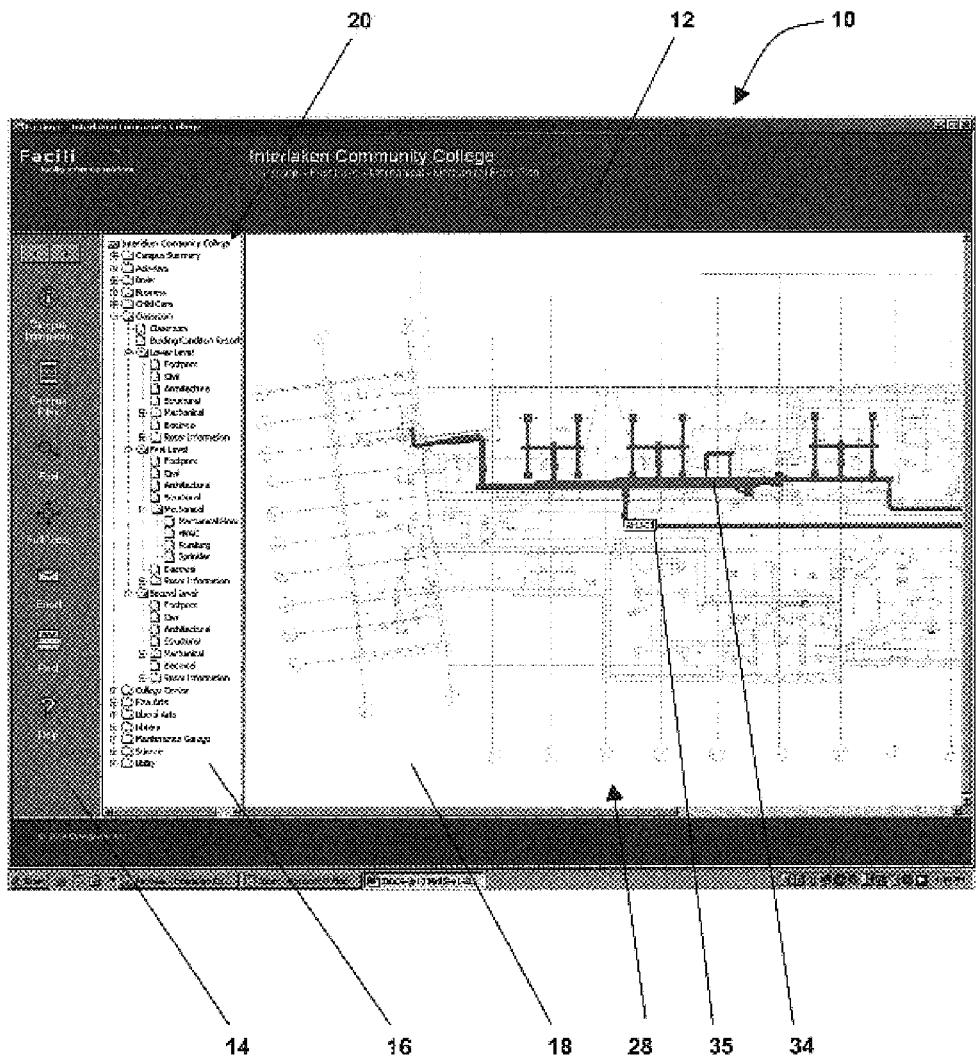
Figure 13:
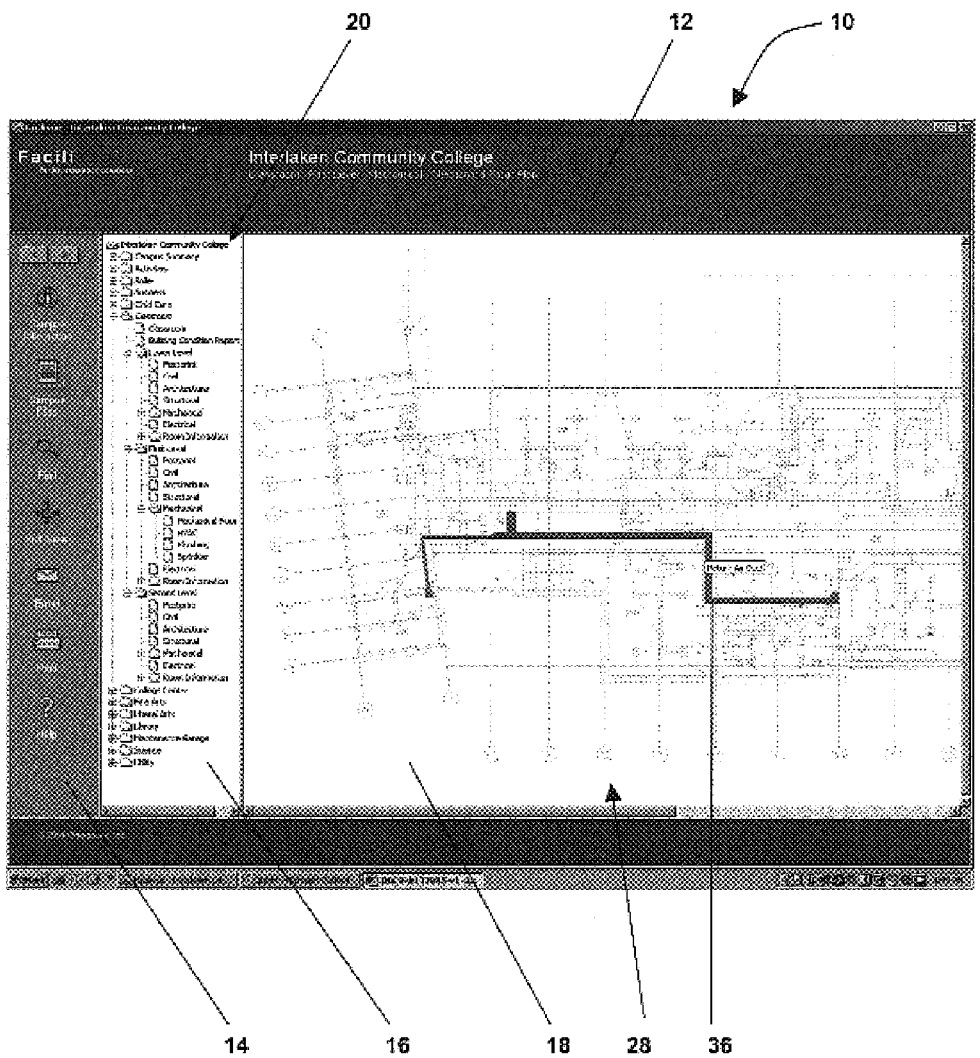

Referring to FIGS. 11-13, mechanical plan 28 can include information regarding an HVAC system. In particular, FIG. 11 includes HVAC ductwork shown serving various areas of the floor. A user can access additional information regarding a particular duct run or other feature in one embodiment as shown in FIGS. 12 and 13, wherein particular ducts 34, 36 are highlighted or activated by a mouse cursor to display related information 35.

Figure 14:
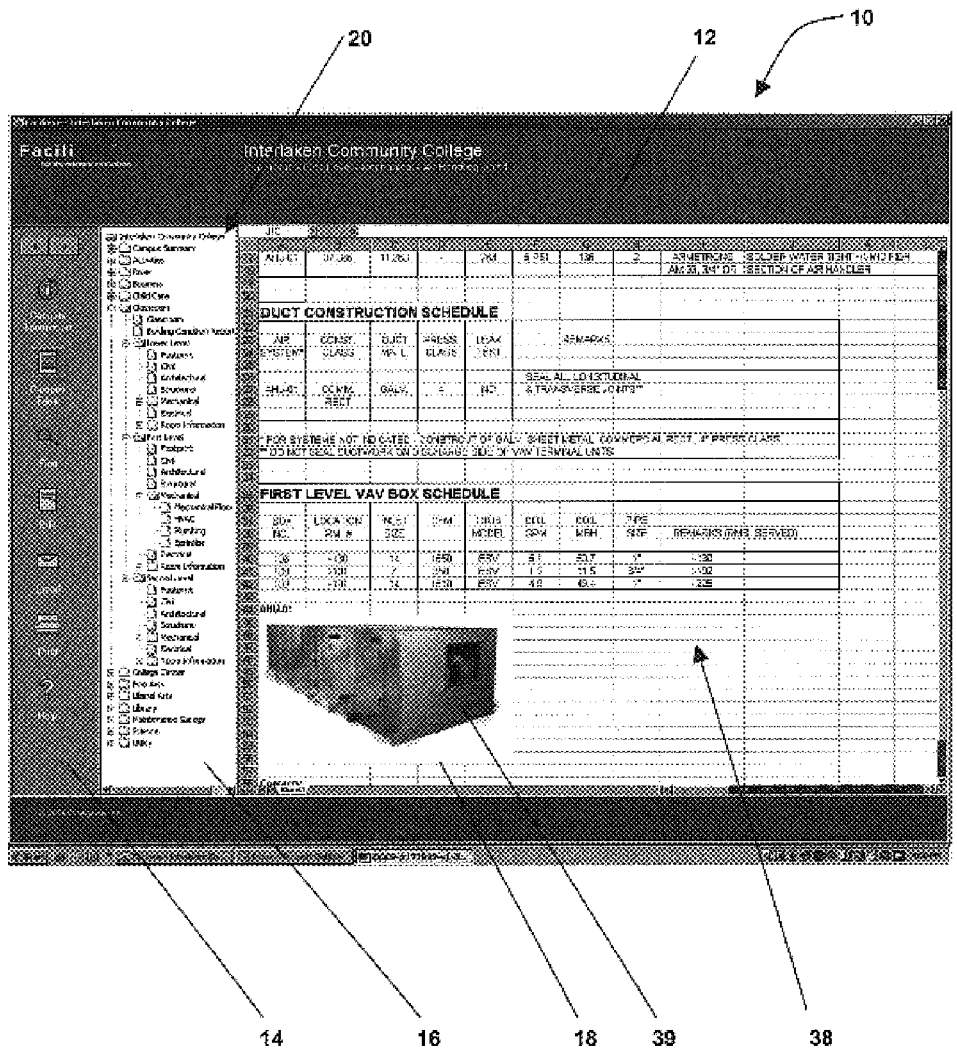

Selecting duct 34 displays related schedule information 38 in FIG. 14. Schedule 38 can be of virtually any format and can include any information relevant and important to a user or manager. Schedule 38 is preferably implemented in a commonly available spreadsheet, data, word processing, or other program, and displays in project window 18 as shown in FIG. 14. In another preferred embodiment, schedule 38 opens in a new program window or secondary user interface such that a user can tile the interfaces or toggle between interface 10 and schedule 38.

Schedule 38 can include customized room information as desired by a particular user. Various schedules can be developed for individual features, equipment, rooms, buildings, or campuses to catalog the standard physical characteristics and attributes of areas of interest. According to the spreadsheet, data, word processing, or other program used, schedule 38 can also be customized with drop-down menu options, hyperlinks, or other specialized features depending on the particular needs or desires of the facility owner or other user. For example, schedule 38 includes vendor and characteristic data for duct 34 and a related air handling unit. Schedule 38 also includes a photo 39 of the air handling unit and can be used to track service, maintenance, and related costs. Photos can be incorporated by a supplier or user, upon system initiation or later during regular use, of any feature or equipment.

Information relating to particular vendors and suppliers of parts and service associated with an area or equipment can be recorded or listed in schedule 38 or, in one preferred embodiment, up-to-date phone and contact information for the vendors and suppliers of original, replacement, or related equipment can be provided as a subscription directory. Listings in such a directory can be made available to vendors on a paid subscription basis or can be otherwise made available to vendor and user parties. Access to the directory can also be based upon a user subscription. The directory can be incorporated into schedule 38 by e-mail and web site hyperlinks or general information listings, or can be linked or related through the system, for example as a hyperlinked program or network-connected feature if enabled.

Figure 9:
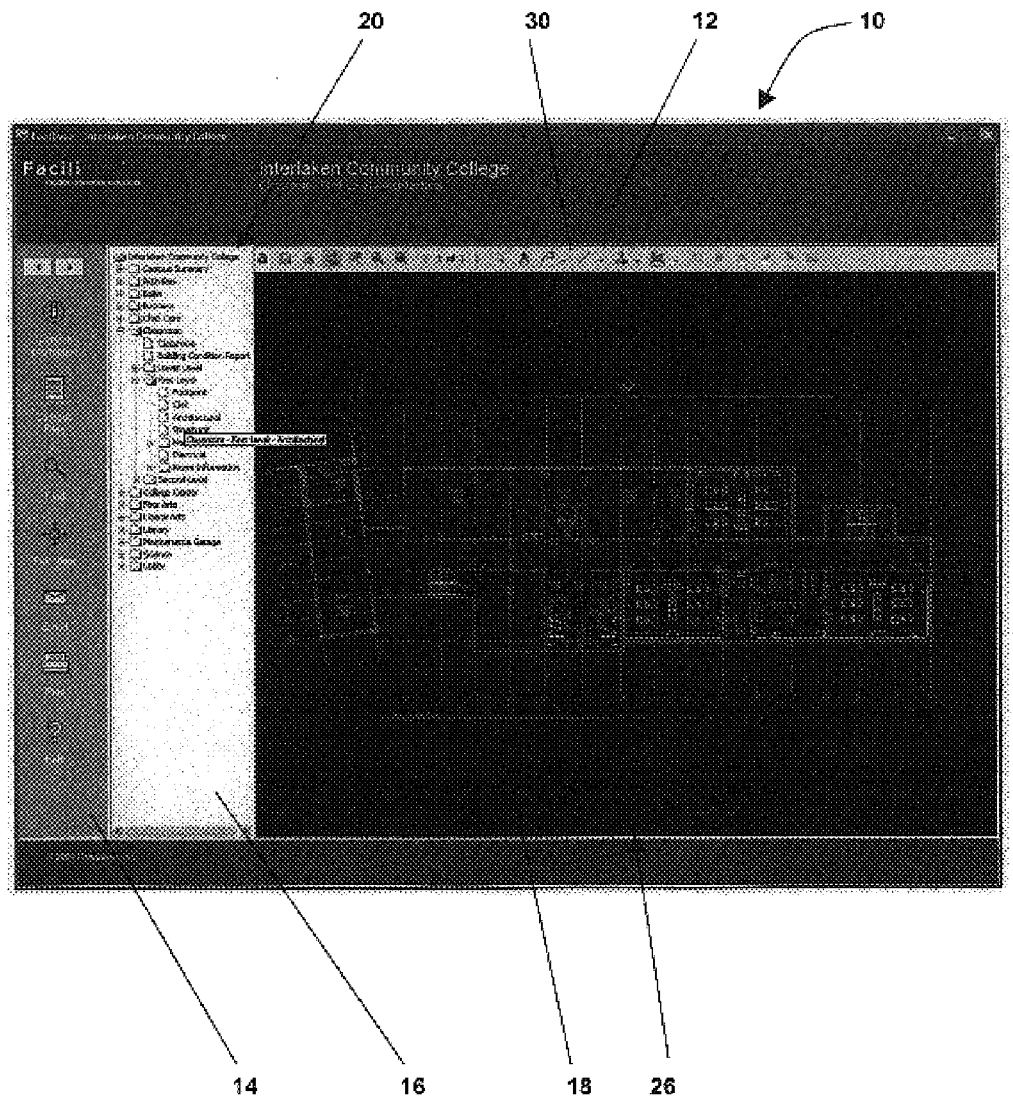
Figure 10:
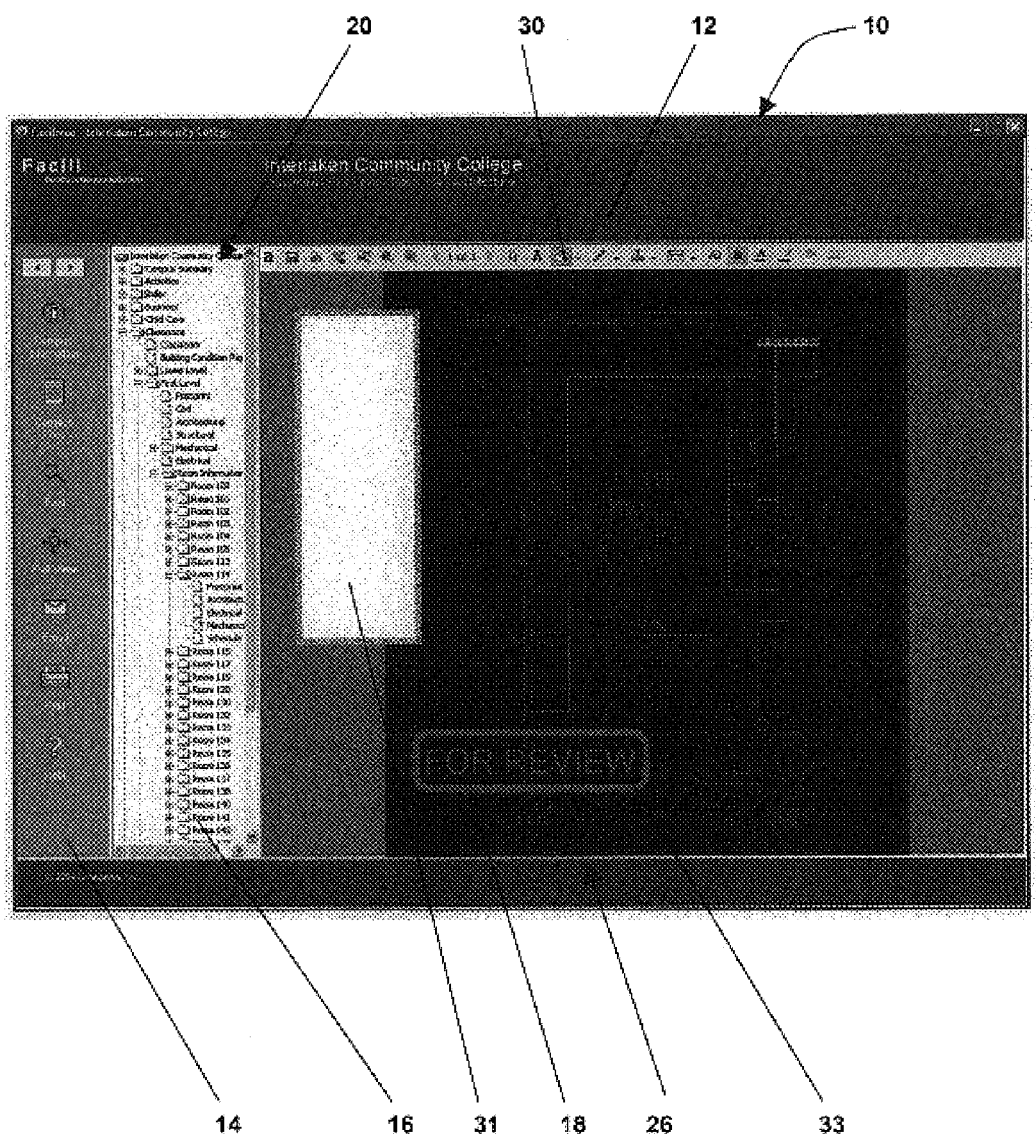

As previously described, users can be given general or password protected administrative and editorial access, and owners can elect to load their own supplementary data in addition to the base information within the invention, and keep system data and information current with ongoing or periodic updates. FIGS. 7, 9, and 10 include editing tools 30 that can be made available to users to edit plans and other files. Tools 30 can vary according to the file format or view currently displayed or functions generally available and can include, for example, zoom, pan, layer selection, labeling, generally editing, and the like. A text box 31 can be inserted to add detail or information regarding a room feature or instructions for service, maintenance, or other attention. A label 33 can be added to mark drawings prior to printing, e-mailing, or other distribution. Other tools can be made available with other file and document formats and programs compatible with the system. Accordingly, specialized CAD drawing and editing tools, word processing tools, and spreadsheet tools can be available when those document programs or formats are in use.

Figure 15:
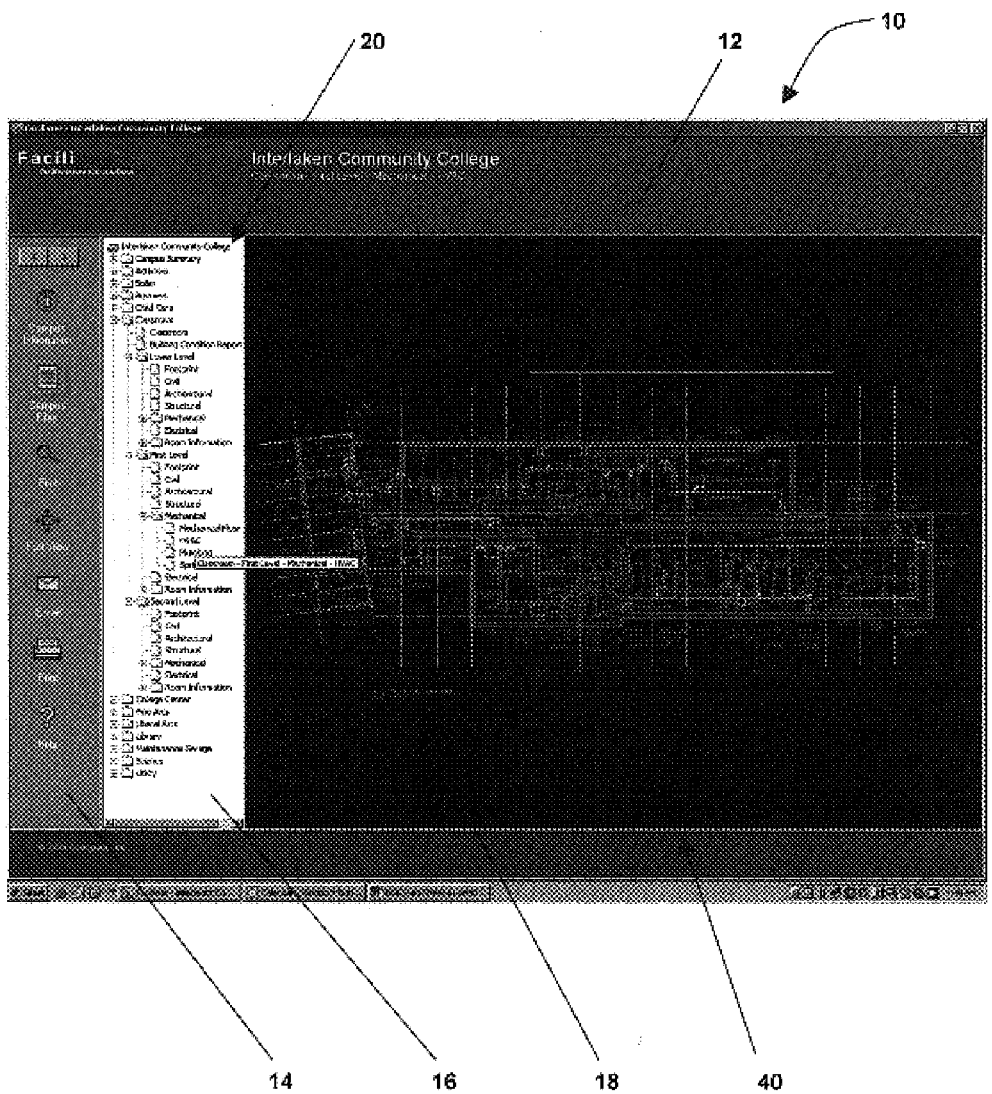
Figure 16:
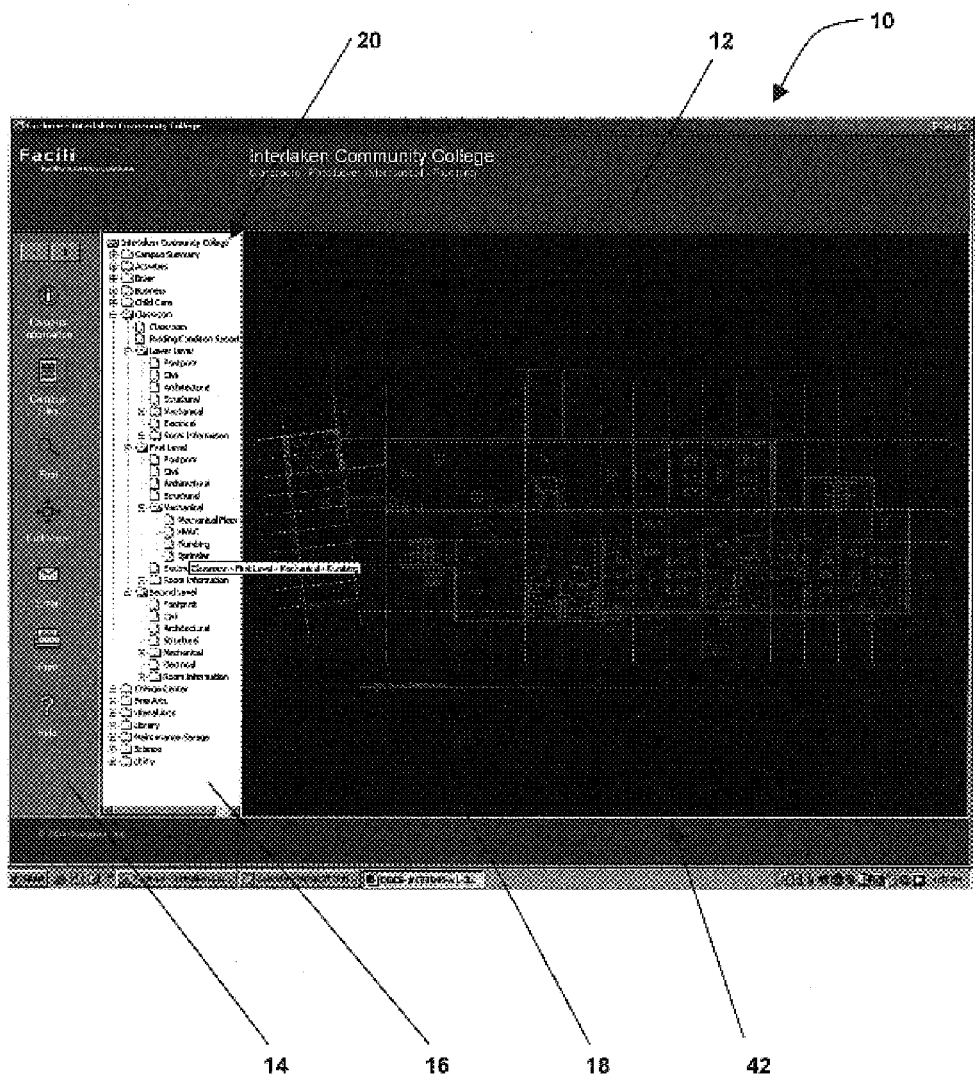
Figure 17:
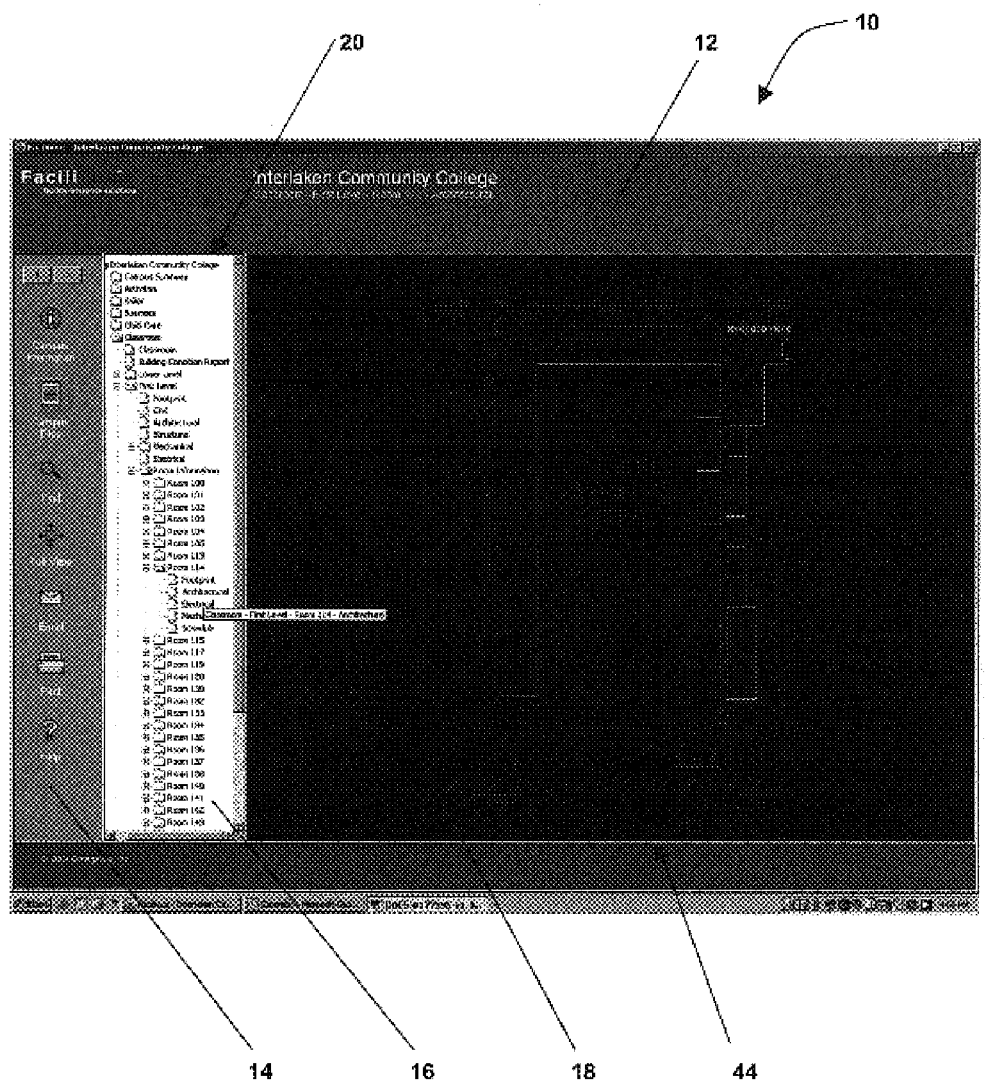
Figure 18:
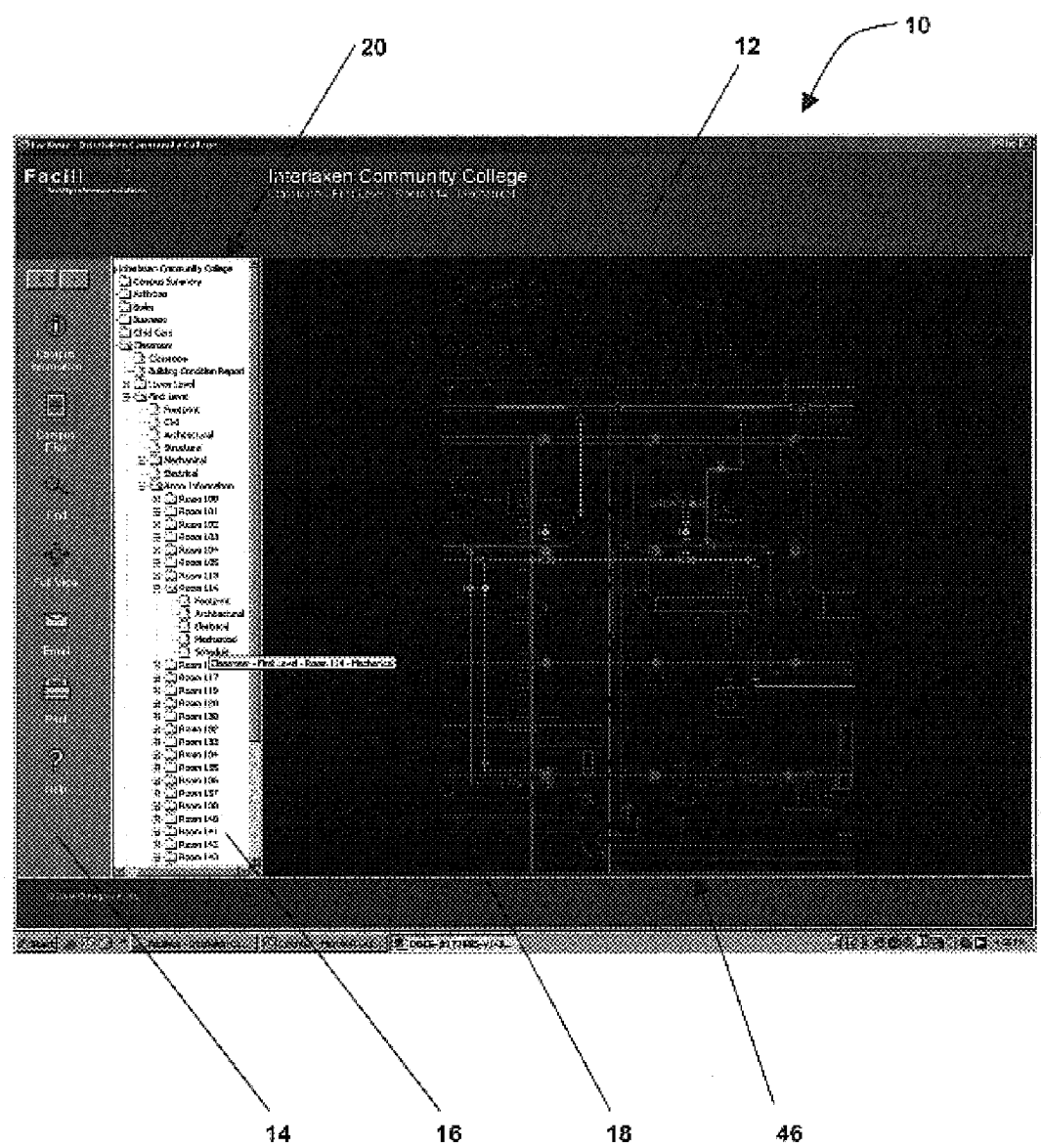
Figure 19:
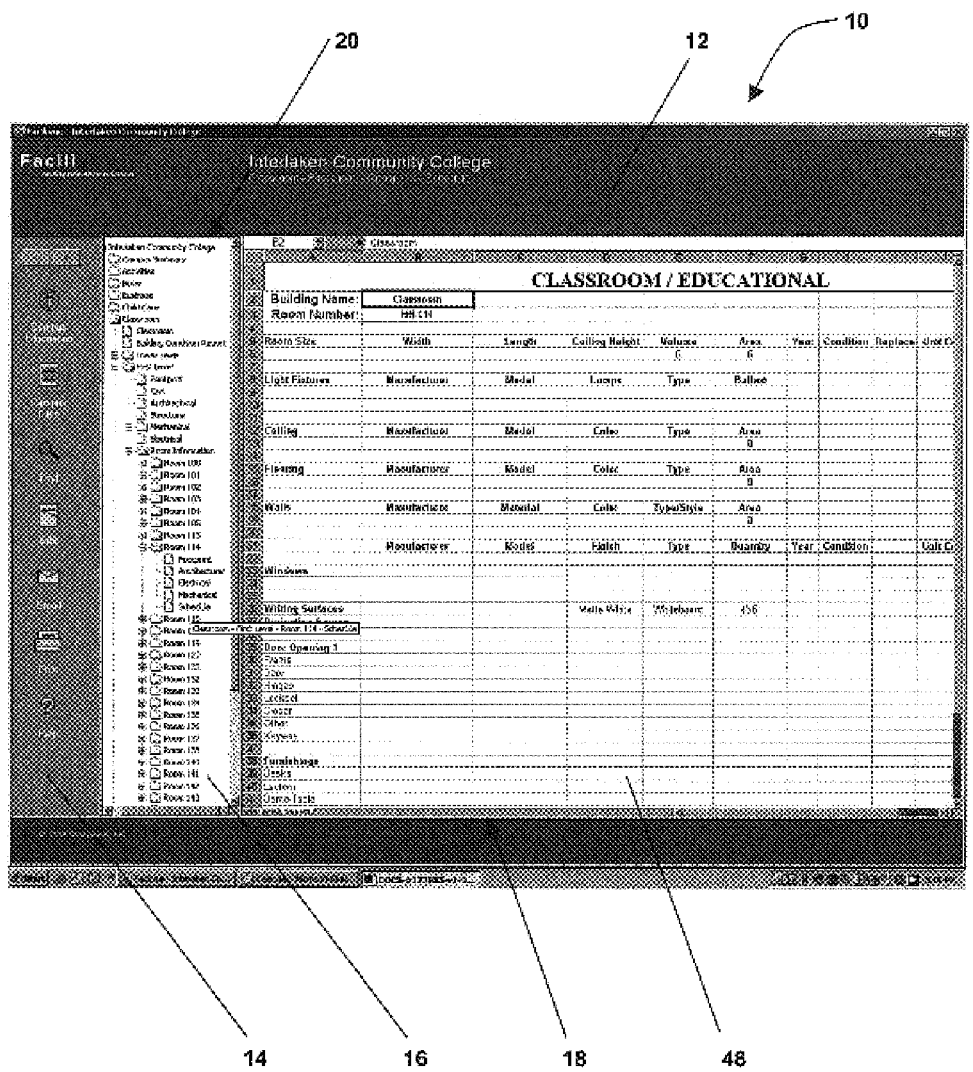

Various other views, plans, and documents can also be incorporated into the system and viewed in window 18. For example, FIG. 15 shows a mechanical HVAC plan 40 and FIG. 16 a mechanical plumbing plan 42 in window 18. Views can be as detailed as a user or manager desires or according to the information available. FIG. 17 is an architectural plan 44 and FIG. 18 is a mechanical plan 46, each of an individual room included in the floor plans described above. A schedule 48, as shown in FIG. 19 and similar to schedule 38 described above, can be included and made available in conjunction with any campus, building, floor, or room view or plan, enabling a facility owner, manager, or user to quickly and easily determine a building or room's time availability and fixture specifications, among other characteristics and information.

Figure 20:
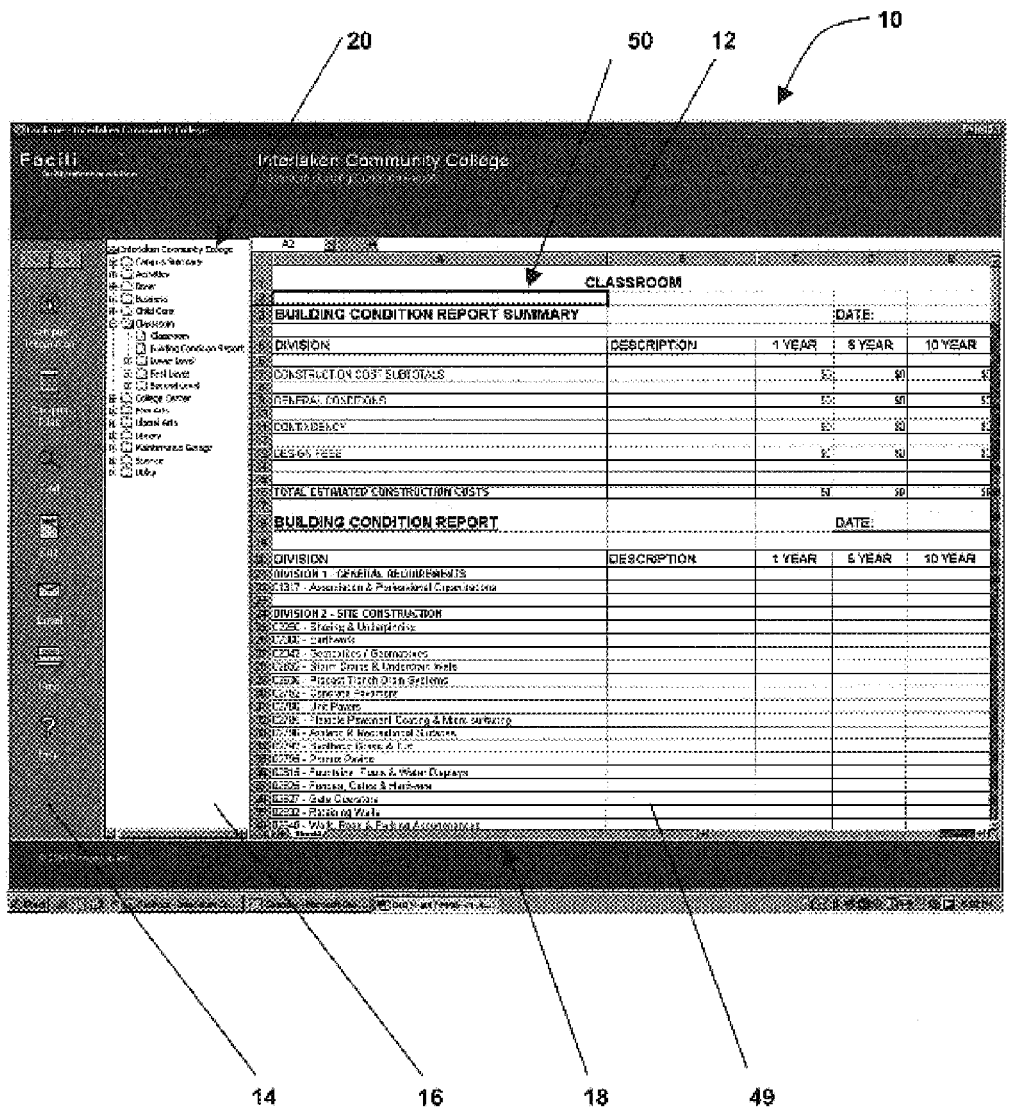
Figure 21:
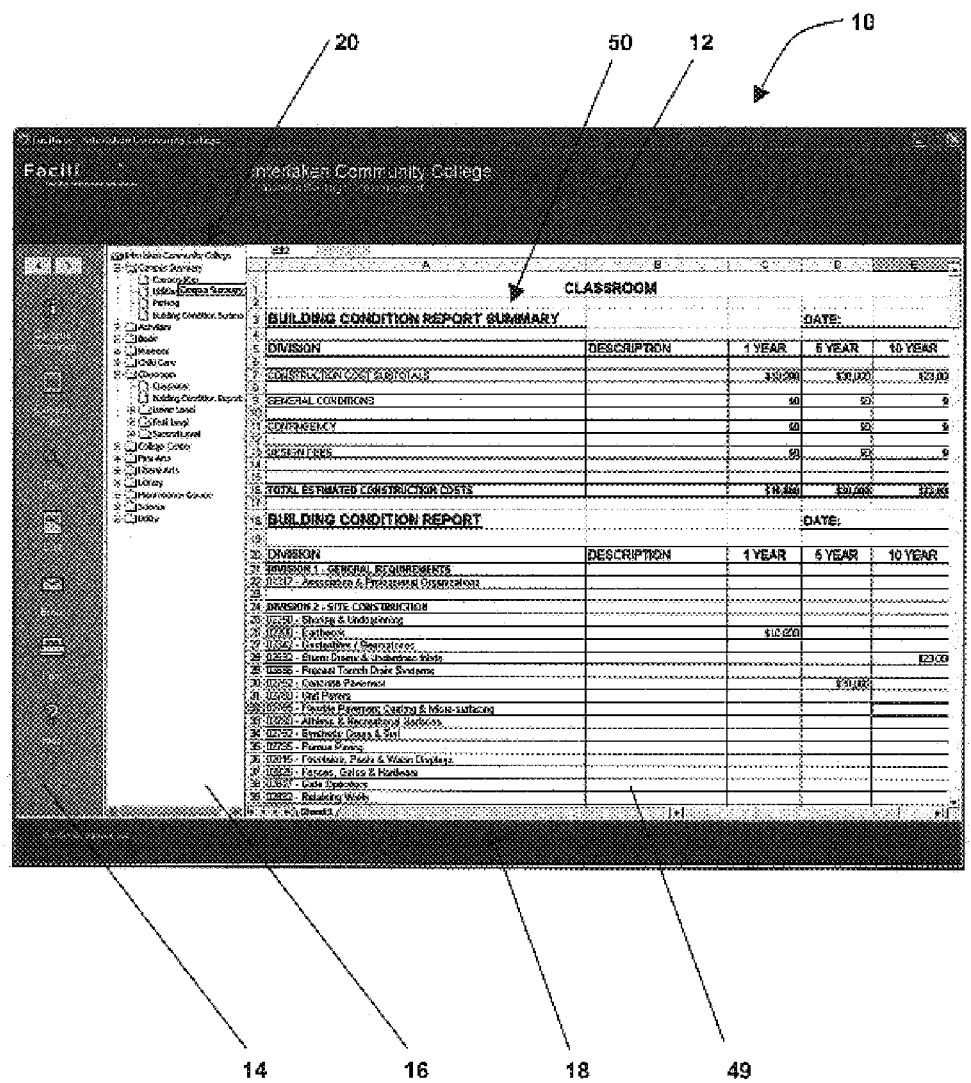
Figure 22:
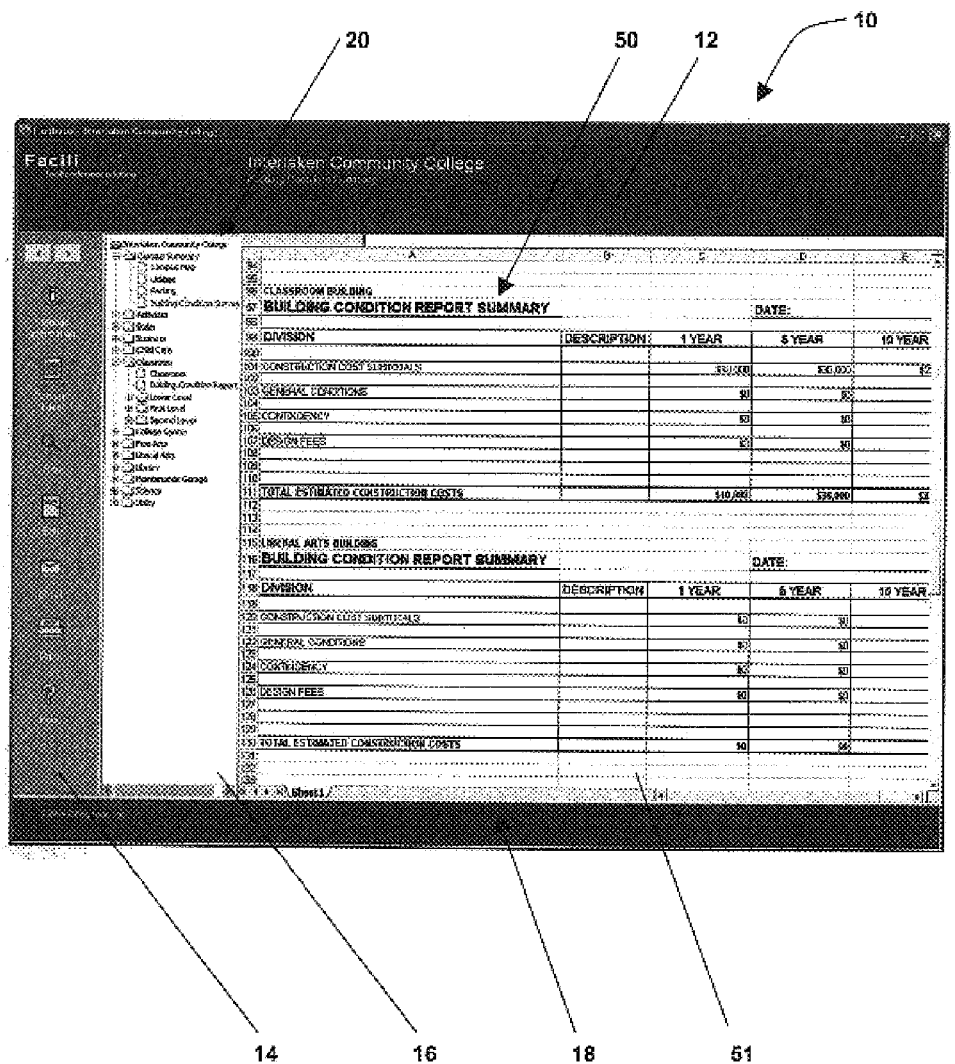

Data and information entered in one or more schedules 48, each associated with an individual room or other area of interest, can be automatically tracked and tabulated by the system in preferred embodiments to update a building condition report 49 in FIG. 20. Building condition report 49 is a total summary of itemized project scopes that follow. Users can enter separate projects, costs by specification section, and other information, and then can sum the cost totals for each project automatically into the building condition summary 50 at the top of building condition report 49. FIG. 21 shows sample cost figures entered into building condition report 49, with corresponding automatic sums shown in building condition summary 50. The summary totals of building condition summary 50 can then carry automatically to a facility condition summary sheet 51 shown in FIG. 22 to provide a user or manager with a total projected maintenance or other service cost for all relevant buildings and/or areas. A user can easily navigate between building condition report 49 and facility condition summary sheet 51 with document tree 20. Other sheets and reports can also be created and incorporated into the system, associated with different areas of interest or organized on the basis of project, crew, timeline, or any other criteria of interest.

Figure 23:
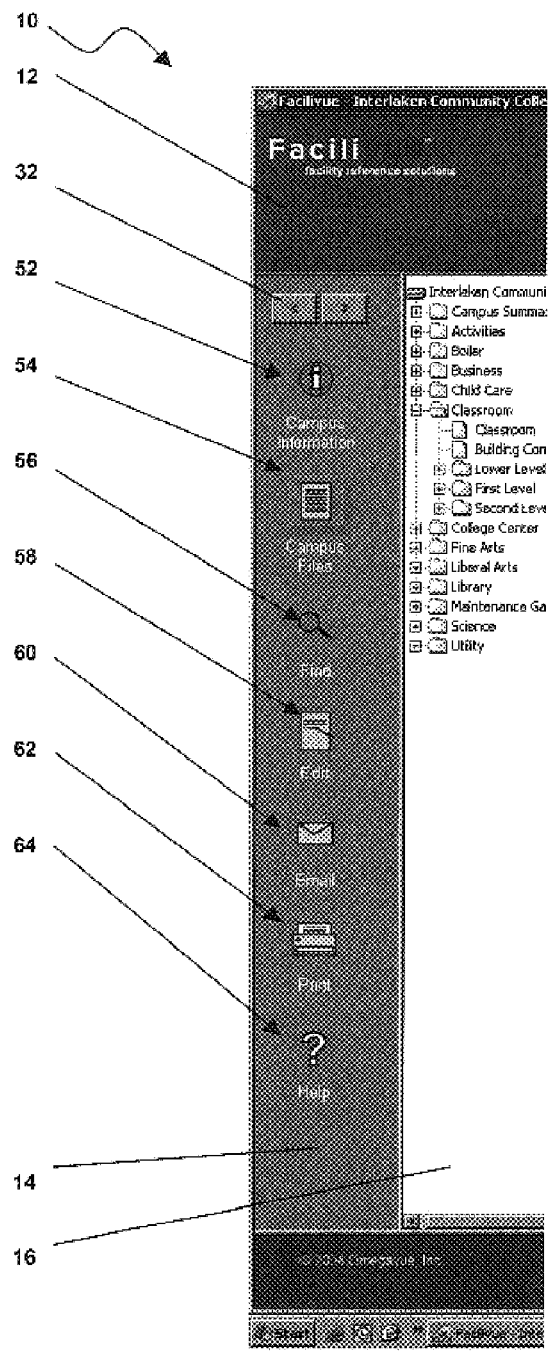
FIG. 23 is an enlarged view of a portion of a user interface according to one embodiment of the invention.

Within the various view levels, tools and functions are available in addition to the above-described tools to alter the view, display additional information, or otherwise manipulate the picture, image, or view within interface 10. The tools and functions, along with various navigation tools, are preferably accessible directly from user interface 10 as links in project tools 14 in preferred embodiments and as shown in FIG. 23. An edit function can be available in project window 18 as a series of tools, buttons, and/or links. In one embodiment, the find/search function also loads in user interface 10 within project window 18. Navigation buttons 32, a campus information link 52, and a campus files link 54 supplement document tree 20 to provide quick and easy navigation within user interface 10 to access various documents and files. Exemplary tools and functions included in one preferred embodiment include a find 56, edit 58, email 60, print 62, and help 64.

Figure 24:
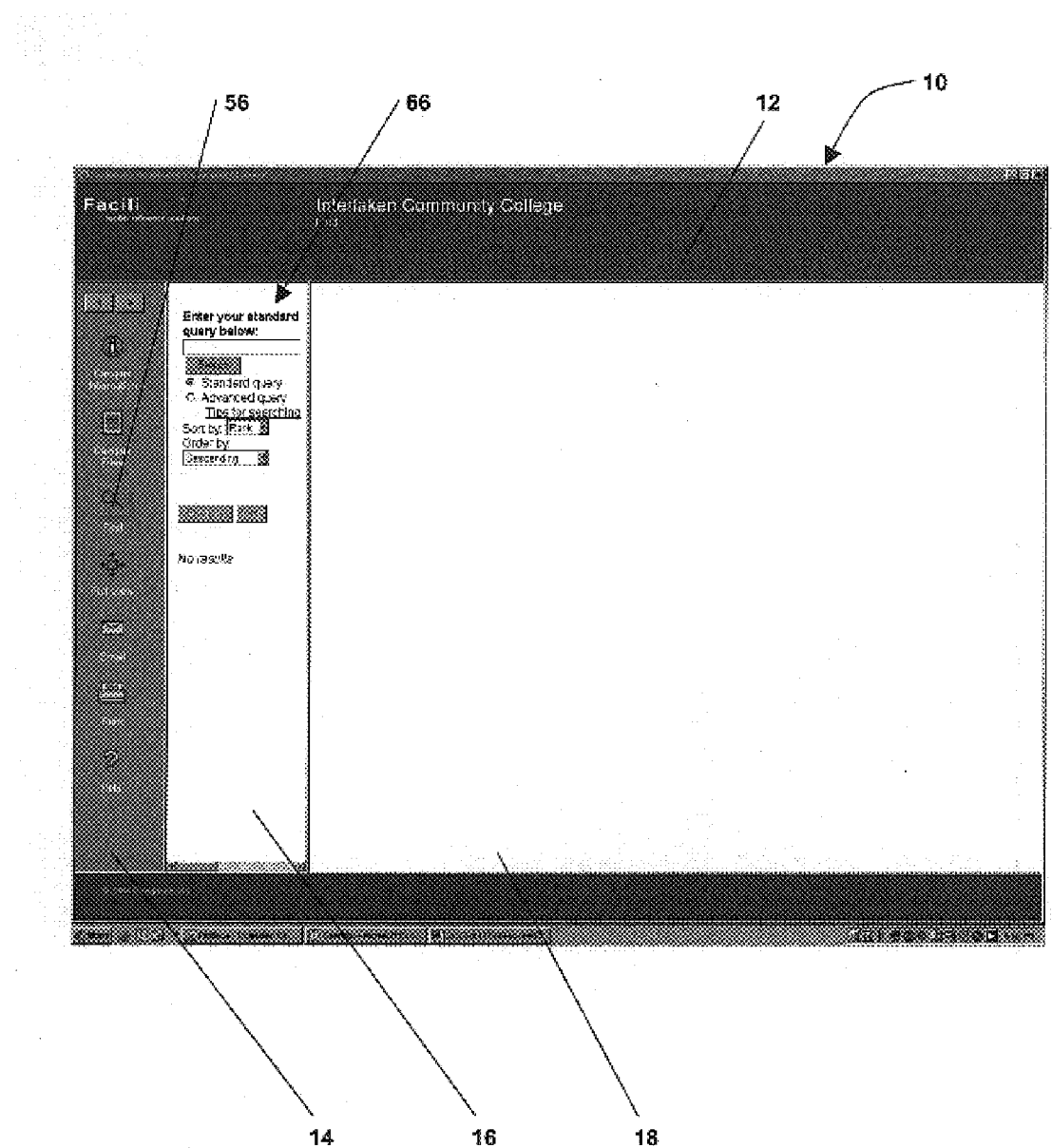
FIGS. 24-29 are views of a user interface according to one embodiment of the invention.
Figure 25:
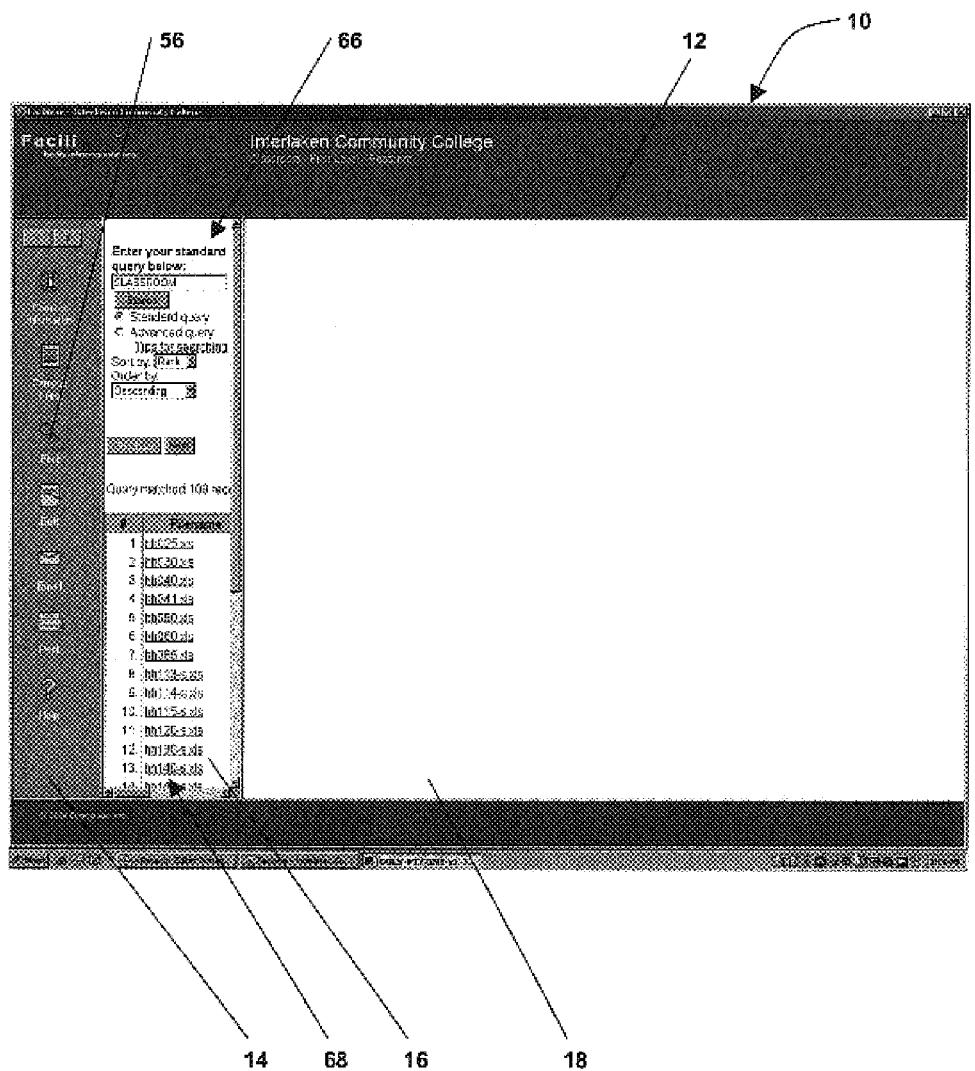
Figure 26:
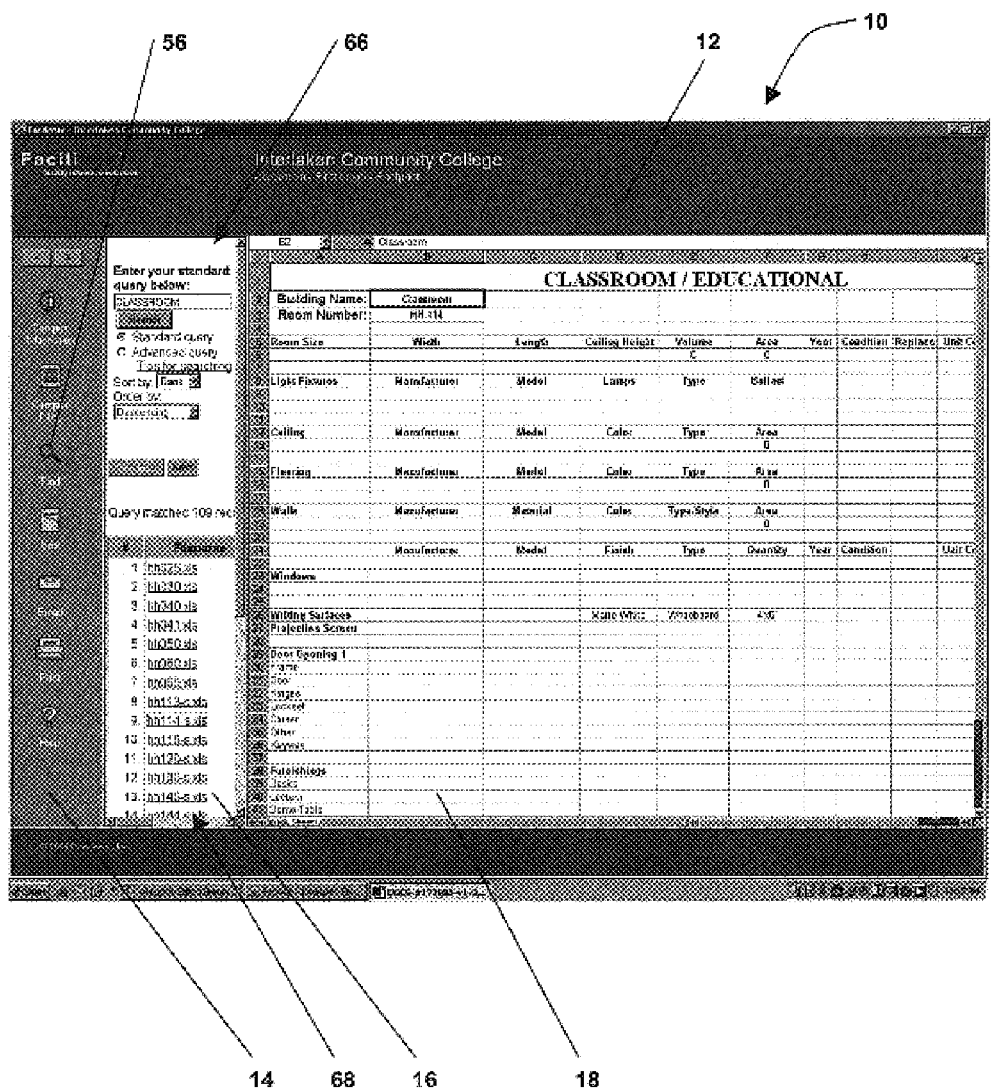

In FIG. 24, a search query field 66 is shown, which is accessed via find tool 56. Search query field 66 enables users to search for and locate particular features or items described in schedules and other documents. Referring to FIG. 25, after a query is entered in field 66, any returned results 68 are displayed in data area 16. In one preferred embodiment, results 68 are displayed as hyperlinks to documents that include the particular search query. A user can select a result 68, and the related document is then displayed in window 18, for example as shown in FIG. 26.

Figure 27:
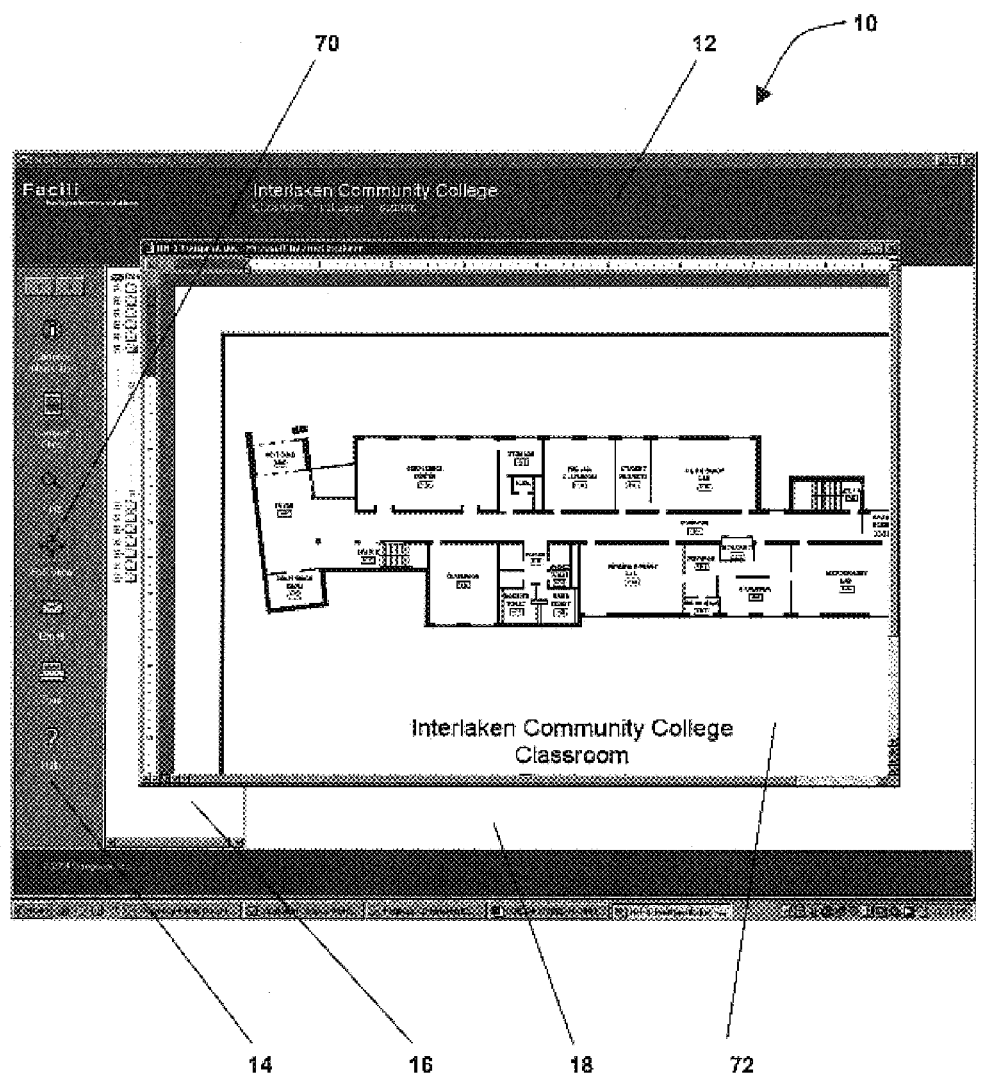

The functions available in project tools 14 can vary according to a document format in use or other characteristic. FIG. 27 shows a full view function 70. Selecting full view function 70 displays a current document in a new window 72.

Figure 28:
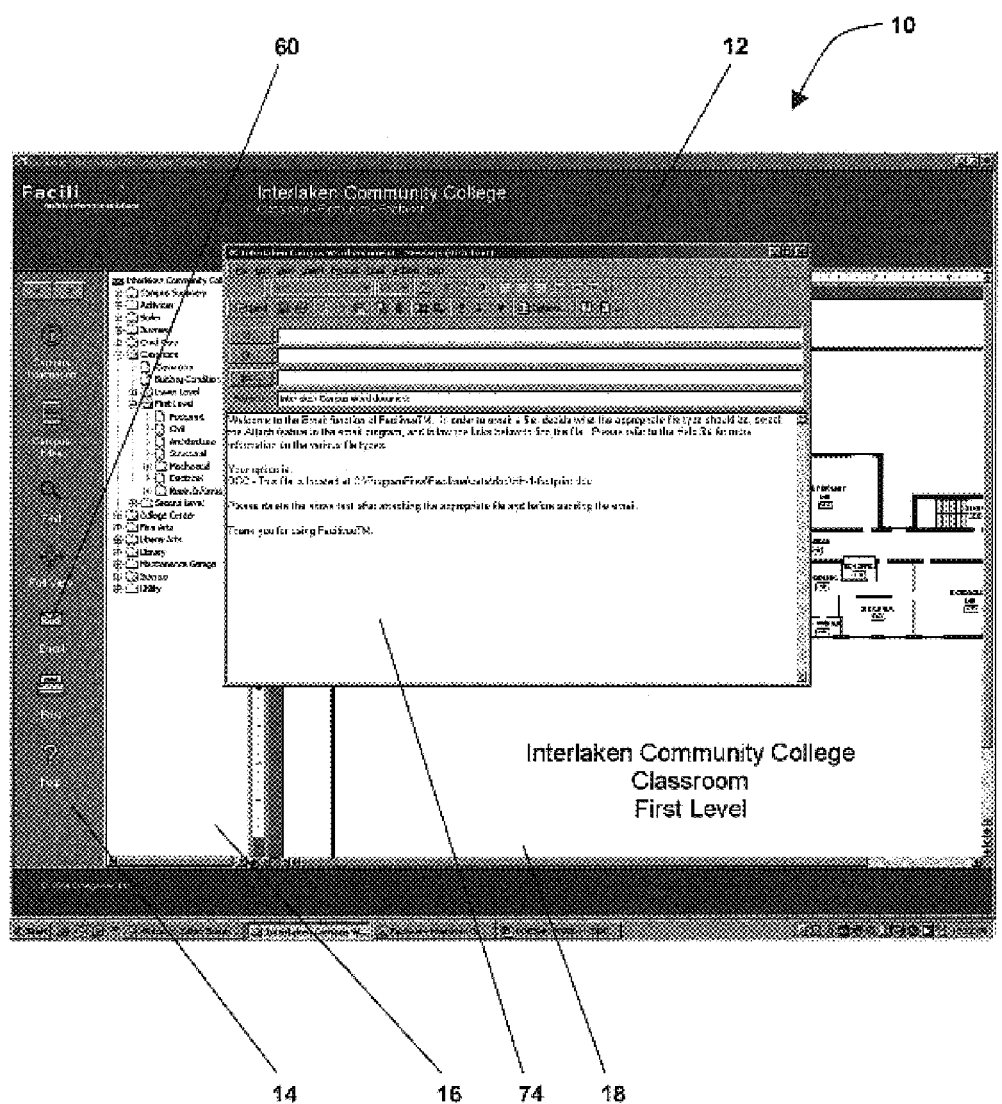

FIG. 28 depicts email function 60. Selecting email function 60 creates an email message 74 in an application email or communication program. Message 74 can include instructions regarding how to insert or attach a document to be sent.

Figure 29:
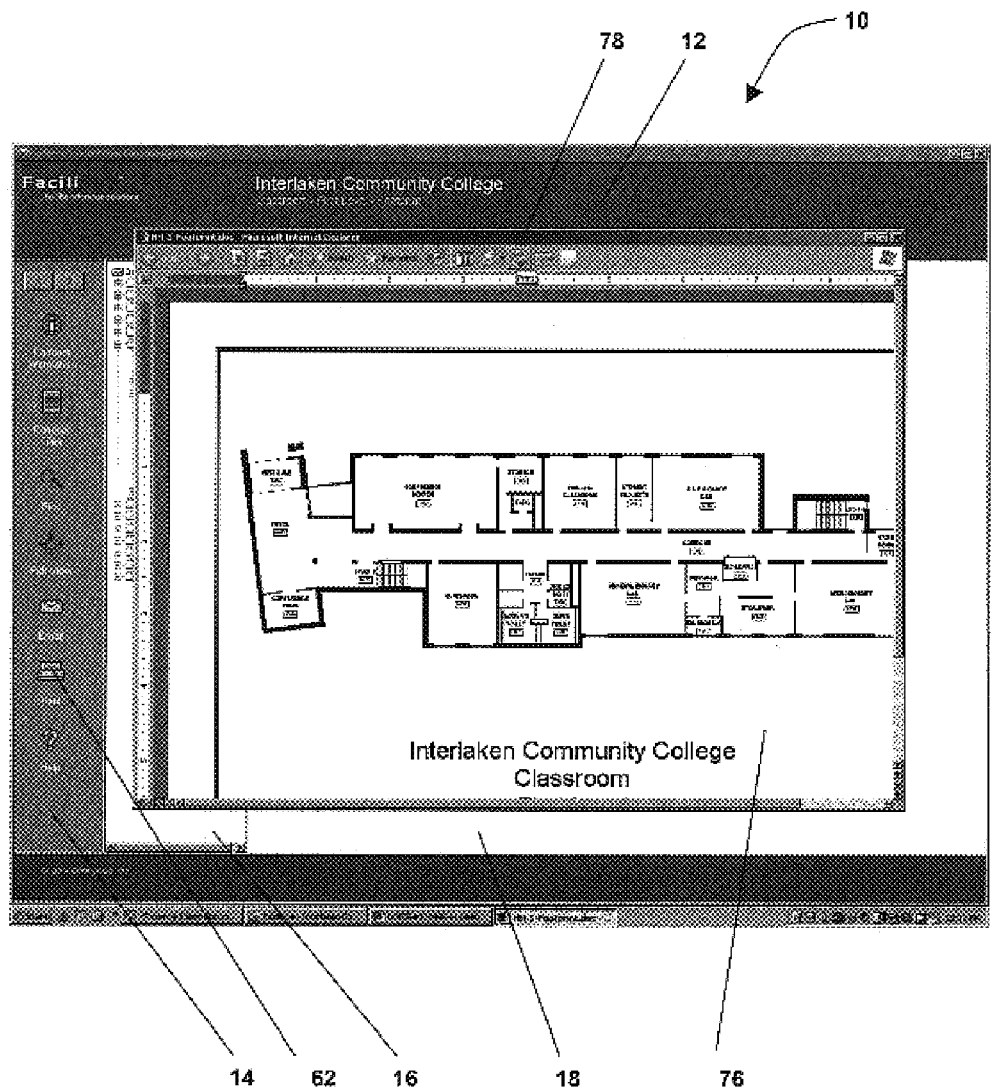

One preferred embodiment of a print function is shown in FIG. 29. After selecting print function 62, a new window 76 is opened and displayed from which a user can print 78 the selected document.

Referring to FIG. 23, help function 64 can also be included. The information available upon selection of help function 64 can include an index of topics, frequently asked questions, links to relevant web sites, email query links, telephone and other contact information, and the like.

Figure 30:
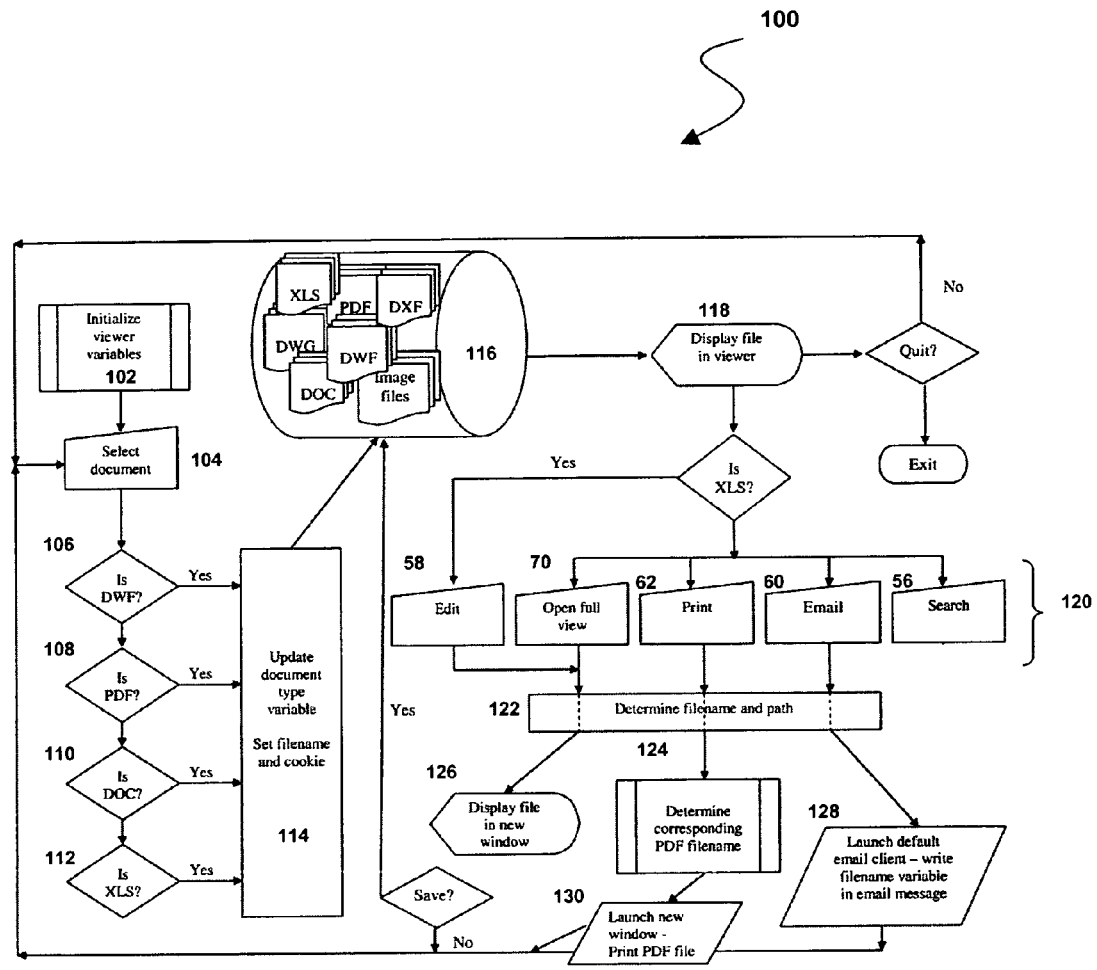
FIG. 30 is an operation flowchart according to one embodiment of the invention.

As FIG. 30 illustrates in a system document flowchart 100, each drawing or document loaded in project window 18 of user interface 10 as described above with reference to FIGS. 1-29 has an associated document variable that the system uses to determine the document name and document type. At initial load, the viewer variables are initialized by the system at step 102. The document variable is updated when the user selects a drawing or document in document tree 20 in project data window 16 at step 104. The system determines whether the selected document is, for example, a DWF, PDF, DOC, or XLS file, or some other compatible image, file, or document format in steps 106-112, and next updates the document variable type at step 114. At step 116, the selected drawing or document is retrieved and loaded in the system and then displayed in project window 18 of interface 10 at step 118. The particular document formats and file extensions as illustrated in FIG. 30 and discussed herein are exemplary of only one preferred embodiment of the system; however, it will be understood by those skilled in the art that other file types and formats can be implemented in the system without departing from the spirit or scope of the invention.

The functions, some of which are illustrated at step 120, that can be performed upon the selected drawing or document are based upon the value of the current document variable as updated in step 114 and the associated document-type subroutine. Subroutines are incorporated for each drawing or document type, as well as for the various functions of step 120 that the system provides. Functions that can be performed upon the selected drawing or document are available or not available depending upon the function selected and the document type.

The system preferably relies upon the operating system of the local computer, and the applications that are installed on the local computer, to determine which application handles the display of selections in one embodiment. For example, CAD drawing files can be displayed within user interface 10 using an associated CAD viewer. The system preferably provides access to a variety of CAD file formats to enable users to share plan documents with others who may use different primary program formats. DWF VIEWER or EXPRESS VIEWER available from AUTODESK can be used in one preferred embodiment, although other applications known to those skilled in the art can also be used.

The system can include various file types of and associated with the same CAD drawing file. In addition to the original CAD file and to accommodate the viewing functionality of CAD drawings in the web browser, in one preferred embodiment a corresponding Drawing Web Format (DWF) or other format file is created from the original design file (DWG). The DWF file format, created by AUTODESK, allows viewing of CAD drawings through a web browser using the AUTODESK EXPRESS VIEWER.

Functions as previously described for which subroutines have been developed and made available to the system in one embodiment include find/search, print, full view, edit, and email, as illustrated at step 120. These functions are described in further detail below with reference to FIGS. 30-32.

In one embodiment, when print function 62 (refer also to FIGS. 23 and 29) is selected at step 120 the document variable for the current drawing or document is identified at step 122 and, depending upon the document type, the appropriate print function subroutine for the document type is invoked at step 124. The drawing or document is loaded in a new browser window and then printed at step 130. Compatible documents can also be printed using their original file formats.

To facilitate the various printing requirements of CAD drawings, a corresponding file is created from the original design file. In one embodiment, this file is an ADOBE Portable Document Format (PDF) file. Special printing requirements such as title blocks and layer manipulation can be accommodated using the PDF file format. Design files selected for printing are printed using a corresponding PDG file. Other file types and programs can also be implemented and used in the invention.

Full view function 70 of step 120 enables an entire drawing or document to be viewed in a new window on a full screen (refer also to FIG. 27). This can be helpful when a user views a detailed drawing more easily seen on a full screen view than in the smaller integrated project window 18.

When full view function 70 is selected, the document variable for the current drawing or document is identified at step 122, and the drawing or document is loaded in a new window for ease of viewing at step 126. A user can toggle between user interface 10 and new window 72 as needed. In one embodiment, the functions available via project tools 14 and project window 18 are also available for drawings or documents viewed using full view function 70.

As previously discussed, it may be desired or required by some users to edit documents that are included in the system. Room or facility variables and schedules can change frequently in large buildings or campuses, and one embodiment of the invention enables a user to incorporate these changes into system documents in order to keep the system current and up-to-date. In one embodiment utilizing program plug-in functionality, editing capabilities may be provided at step 128 to facilitate modifying spreadsheet and program data. Edit function 58 at step 120 is particularly useful for scheduling documents or data management spreadsheets.

Figure 31:
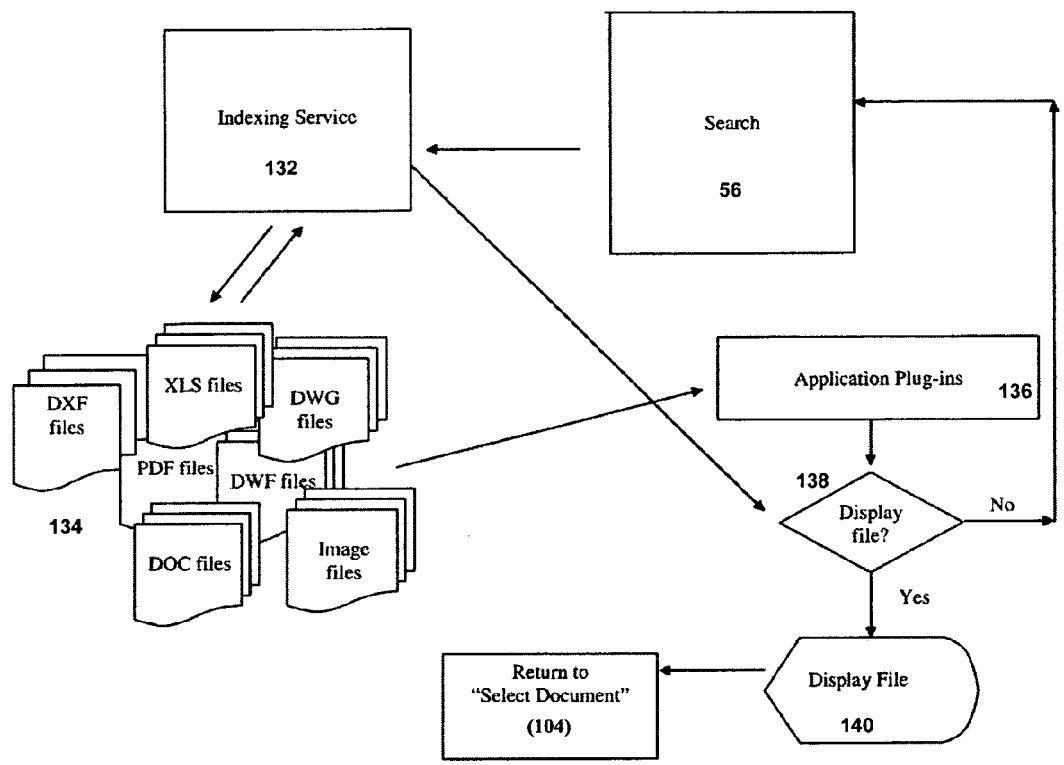
FIG. 31 is a search operation flowchart according to one embodiment of the invention.

FIG. 31 illustrates search function 56. Search function 56 is preferably a third-party application as provided by the user's computer system and provides a means to conduct a comprehensive, indexed search of the drawings or documents included within the system. From a user perspective, the search mechanism is seamlessly integrated into the system and provides complex search capabilities of system contents. Specialized search applications can also be incorporated into other embodiments of the system of the invention. When a search is initiated, an indexing service 132 is used to locate results within files and documents 134 in the system. Necessary application plug-ins 136 are then used to display a search result at step 140 if selected at step 138.

The system can also include email function 60, as shown at step 120 of FIG. 30. Using email function 60, users can easily attach and send system documents or sheets to other users. This function is particularly useful for sharing updated documents with other local users for the purposes of coordinating activities or maintenance. When email function 60 is selected at step 120 for a particular drawing or document, most often the drawing currently displayed in project window 18 of user interface 10, the system determines the associated filename and path of the drawing or document at step 122 and launches the local computer system default email client at step 128. The default email client will launch an email message as described above with reference to FIG. 28 or in another manner compatible with the particular email client used. A user can then customize and complete the message to send the drawing or document to the desired recipient(s).

FIG. 31 also helps to illustrate the relationship between the drawings or documents of various formats included in the system, the user computer system, and the system of the invention. Some file formats, dependent upon user computer system contents and interoperability with the system of the invention, can be natively handled and displayed by the system, for example using a standard browser program, without the use of application plug-ins 136. Other file formats will require the use of application plug-ins 136 in order to display in user interface 10 and related windows and to be utilized by the system.

Figure 32:
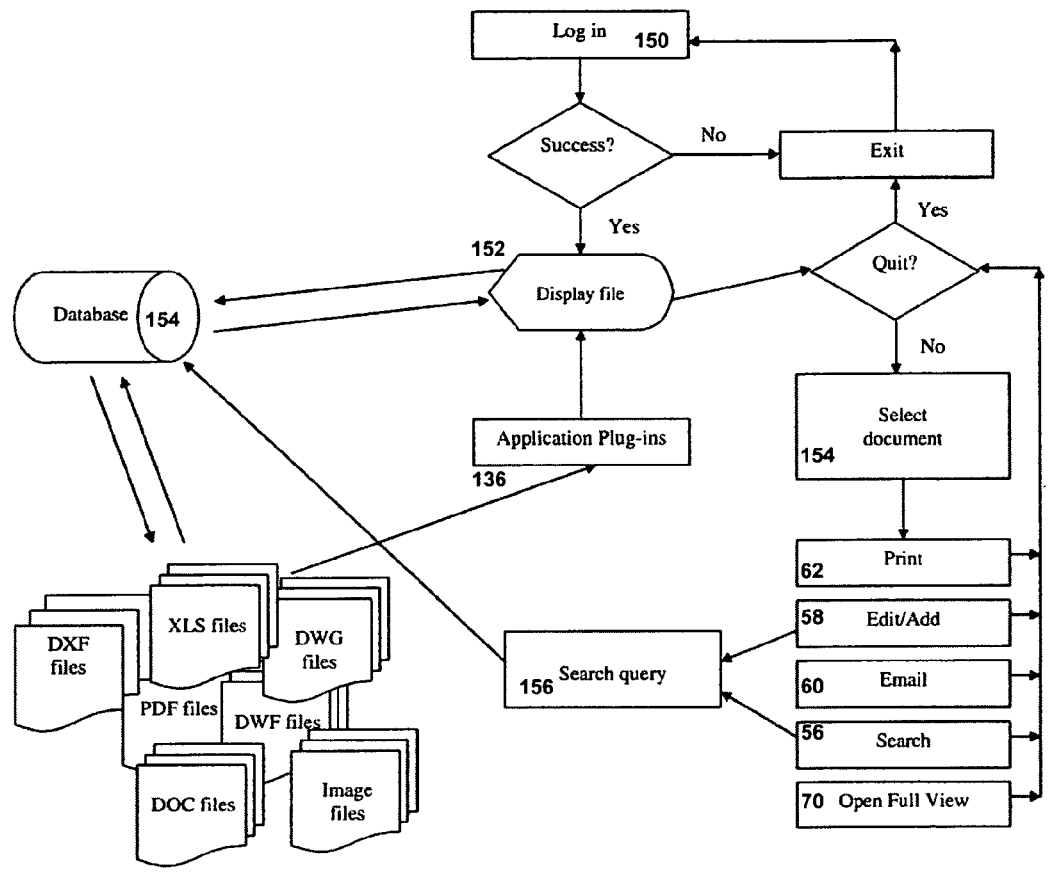
FIG. 32 is a multi-user operation flowchart according to one embodiment of the invention.

User interface 10 and the system of the invention can provide networked, multi-user operation within a server computer system. The server computer system can be a user computer system, a local computer system, or some other networked computer system. FIG. 32 is a multi-user operation flowchart according to one embodiment of the invention. In a networked and/or multi-user environment, the system can work in conjunction with an integrated or autonomous database storage program or system. The system can be initiated on any number of local computers via a program shortcut or link at each location. In this embodiment, the system itself preferably resides on a network server with the database storage program or system. Upon execution of the facility reference system, one or more users can log into the system and user interface 10 is presented on the local computer at step 150. The separately programmed functions of the database program or system control the facility reference system's access to and editing of data stored on the server in one preferred embodiment. As in other embodiments, users can be given different levels of security and editing access to data, controlled by the log-on process. Upon request for a file at step 152, a database subprogram 154 is invoked to search for the requested file(s) and display selected results at step 152. Any application plug-ins 136 necessary to view and/or edit documents are also invoked. Action can be taken on selected files at step 154 generally as described above, including further search options 56, 156.

Edited and newly created files and information can be stored in the database after defining a query window. Database subprogram 154 partially or entirely controls access and save functions in situations in which more than one user is requesting the same document. Upon a request to save information, each user is presented with a query window to define information for retrieval from the database later. Similarly, when searching for data, each user is presented with a more sophisticated initial search query field that allows the user to define parameters more specifically in a search of the database.

Accordingly, a computer-implemented facility reference system according to the invention comprises, in one preferred embodiment, custom content related to a facility, wherein the custom content comprises graphical content, textual content, or any combination thereof and is related to at least one of an architectural, mechanical, and physical feature of a facility, and wherein the custom content has a format type and a variable associated therewith; and a user interface, wherein the user interface selectively displays custom content and information related to the custom content on a computer system according to the variable associated with the custom content, and wherein the user interface includes tools selectable to manage the custom content, edit the custom content, and create new custom content, and an expandable document tree navigation structure to present the custom content with the user interface and on the computer system, wherein the tools are available and selectable according to the variable associated with the custom content.

A method of managing facility reference data and information in a computer system according to one preferred embodiment of the invention can comprise the steps of assembling custom content related to a facility, wherein the custom content comprises graphical content, textual content, or any combination thereof and is related to an architectural, mechanical, or physical feature of a facility; associating a variable with the custom content according to a format of the custom content; providing the assembled custom content and a user interface to the custom content; providing a hyperlinked index of the assembled custom content in a navigable and expandable document tree navigation structure in the user interface; selectively displaying the custom content in the user interface according to the variable associated with the custom content; and providing, in the user interface, tools to selectively view, manage, and edit the custom content in the user interface and to create new custom content, wherein the tools available in the user interface vary according to the variable associated with the custom content.

According to one preferred embodiment of the invention, implemented in a computer system, a computer-readable storage media storing at least one computer program operates as a facility management system for managing data and information related to a facility, and the program comprises the steps of obtaining custom content related to a facility, wherein the custom content comprises graphical content, textual content, or any combination thereof and is related to at least one of an architectural, mechanical, and physical feature of a facility; determining a document format of the custom content and associating a variable with the custom content based upon the determined format; providing a user interface to the custom content at the computer system; providing a hyperlinked index of the custom content in a navigable and expandable document tree navigation structure in the user interface; receiving instructions in the user interface to retrieve selected custom content; retrieving the selected custom content and determining the variable associated with the selected custom content; generating an image in the user interface related to the selected custom content according to the variable associated with the custom content; and automatically updating the document tree navigation structure according to the image in the user interface.

The invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed:

1. A computer-implemented facility reference system for managing custom content that includes graphical content, textual content, or any combination thereof, and is related to at least one of an architectural, mechanical, and physical feature of a facility, the system comprising:
   a user interface that enables access to selected custom content related to the facility, and that displays the selected custom content and information related to the custom content, wherein the user interface includes:
   a variable-view document tree navigation structure that provides links to items of the custom content via the user interface; and
   a geographical overview display of the facility having a variable level of displayed detail, the geographical overview display providing user access to the custom content via selection of portions of the geographical overview display;
   wherein in response to either a selection of an item of custom content from the geographical overview display or the document tree navigation structure, that custom content is automatically displayed in the user interface, and a display of the variable-view document tree navigation structure is automatically updated such that an index of specific items of custom content associated with the selected item of custom content is displayed.

2. The system of claim 1, wherein the links to items of custom content comprise hyperlinks.

3. The system of claim 1, wherein the custom content comprises a computer aided design (CAD) file, a word processing document, a spreadsheet, a photograph, a drawing, a web-based resource, or any combination thereof.

4. The system of claim 1, wherein the custom content has a format type and a variable associated with the custom content that represents attributes of the custom content.

5. The system of claim 1, wherein the custom content comprises a schedule document, and wherein the schedule document comprises a directory of facility vendors and suppliers.

6. The system of claim 5, wherein the directory is available as a subscription.

7. The system of claim 1, wherein the user interface comprises a first window including an information portion, a tool portion, a data portion, and a presentation portion.

8. The system of claim 7, wherein the user interface comprises a second window to display custom content according to the variable associated with the custom content.

9. The system of claim 1, wherein the user interface comprises tools selectable to manage the custom content, edit the custom content, and create new custom content.

10. The system of claim 9, wherein the tools are available and selectable according to the variable associated with the custom content.

11. The system of claim 1, further comprising a database, wherein the database is accessible by a plurality of users, each via a distinct user interface.

12. The system of claim 1, further comprising a communication interface with at least one facility system, wherein the communication interface provides real-time custom content from a facility system to the user interface.

13. The system of claim 1, wherein the user interface comprises a search query field, and wherein the custom content is searchable by the search query field.

14. The system of claim 1, wherein the variable view document tree navigation structure comprises a hierarchical structure corresponding to the spatial geometry of the facility.

15. The system of claim 1, wherein selection of a portion of the geographical overview display automatically updates the geographical overview display to a zoom level corresponding to the accessed custom content.

16. The system of claim 1, wherein in response to a selection of any item of custom content the document tree navigation structure automatically displays at least two subcategories of indexed custom content,
   wherein the subcategories are selected from a class consisting of civil, architectural, mechanical, structural, electrical, footprint, and other room information.

17. The system of claim 16, wherein the subcategories vary according to a zoom level corresponding to the accessed custom content.

18. A computer-implemented method of managing facility reference data and information in a computer system, the method comprising:
   storing custom content related to a facility, the custom content having graphical content, textual content, or any combination thereof, and is related to an architectural, mechanical, or physical feature of the facility;
   providing a user interface operable to access and display the custom content;
   providing a hyperlinked index of the assembled custom content in a variable-view document tree navigation structure viewable in the user interface;
   providing a geographical overview display of the facility viewable in the user interface and having associations to items of custom content corresponding to geographic locations of the geographical overview display;
   in response to either a selection of a geographic location shown in the geographical overview display or custom content in the hyperlinked index, automatically displaying corresponding custom content in the user interface, and automatically updating the variable view of the document tree navigation structure such that the document tree navigation structure displays an index of specific items of custom content associated with the selected geographical location of the geographical overview display.

19. The method of claim 18, further comprising:
   associating a variable with the custom content representing attributes of the custom content;
   providing, in the user interface, tools to selectively view, manage, and edit the custom content in the user interface and to create new custom content, wherein the tools available in the user interface vary according to the variable associated with the custom content.

20. The method of claim 18, wherein the associations to items of custom content comprise hyperlinks.

21. The method of claim 20, further comprising selecting a hyperlink corresponding to a geographic location of the geographical overview display.

22. The method of claim 18, further comprising providing, in the user interface, a directory of facility vendors or suppliers.

23. The method of claim 22, further comprising requiring a subscription for access to or listing in the directory.

24. The method of claim 18, further comprising:
   storing the custom content in a database;
   providing access to the custom content to a plurality of users, each via a distinct user interface including a log-on process; and
   presenting a query to define information prior to saving new or edited custom content to the database.

25. The method of claim 18, further comprising:
receiving real-time facility information; and
providing the real-time facility information in the user interface.

26. The method of claim 18, further comprising:
entering a search query in the user interface;
selectively searching the assembled custom content for the search query; and
providing search results in the user interface.

27. The method of claim 18, further comprising:
emailing selected custom content from the user interface.

28. The method of claim 18, further comprising:
providing a schedule of data and information relating to a facility, the schedule being associated with a variable;
editing the schedule in the user interface; and
automatically updating a related schedule according to the editing.

29. The method of claim 28, wherein editing the schedule comprises incorporating digital photographs into the schedule.

30. A computer-readable medium storing at least one computer program that, when executed on a computer system, causes the computer system to operate as a facility management system for managing data and information related to a facility, the computer program comprising instructions that cause a computer system to:

store custom content related to a facility, the custom content having graphical content, textual content, or any combination thereof, and is related to an architectural, mechanical, or physical feature of the facility;

provide a user interface operable to access and display the custom content;

provide a hyperlinked index of the assembled custom content in a variable-view document tree navigation structure viewable in the user interface;

provide a geographical overview display of the facility viewable in the user interface and having associations to items of custom content corresponding to geographic locations of the geographical overview display;

in response to either a selection of a geographic location shown in the geographical overview display or the hyperlinked index, automatically display corresponding custom content in the user interface, and automatically update the variable view of the document tree navigation structure such that the document tree navigation structure displays an index of additional items of custom content associated with the selected geographical location of the geographical overview display.

* * * * *